(12) United States Patent
Osa et al.

(10) Patent No.: US 6,396,628 B1
(45) Date of Patent: May 28, 2002

(54) MICROSCOPE TRANSMITTED-ILLUMINATION APPARATUS

(75) Inventors: Kazuhiko Osa, Hachioji; Minoru Sukekawa, Akiruno; Kenji Kawasaki, Musashimurayama, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/514,863

(22) Filed: Feb. 28, 2000

Related U.S. Application Data

(63) Continuation of application No. PCT/JP98/03853, filed on Aug. 28, 1998.

(30) Foreign Application Priority Data

Aug. 29, 1997 (JP) .............................................. 9-234070
Aug. 29, 1997 (JP) .............................................. 9-234784
Aug. 26, 1998 (JP) ............................................. 10-240403

(51) Int. Cl.[7] .............................................. G02B 21/06
(52) U.S. Cl. ...................................... 359/385; 359/738
(58) Field of Search ................................. 359/232, 233, 359/385, 387, 388, 730, 389, 381, 739, 740

(56) References Cited

U.S. PATENT DOCUMENTS

| 4,145,714 A | * | 3/1979 | MacDonald et al. ......... 358/106 |
| 4,255,014 A | | 3/1981 | Ellis ........................... 359/371 |
| 5,392,094 A | * | 2/1995 | Kudo ........................... 355/67 |
| 5,754,335 A | * | 5/1998 | Takagi et al. ................ 359/368 |
| 6,002,467 A | * | 12/1999 | Nishi et al. .................. 362/268 |

FOREIGN PATENT DOCUMENTS

| JP | 41-5808 | 3/1941 |
| JP | 44-12396 | 6/1969 |
| JP | 51-128548 | 11/1976 |
| JP | 56-137324 | 10/1981 |
| JP | 57-178212 | 11/1982 |
| JP | 2-142808 | 12/1990 |
| JP | 3-157609 | 7/1991 |
| JP | 3-267910 | 11/1991 |
| JP | 4-22709 | 2/1992 |
| JP | 4-318804 | 11/1992 |
| JP | 5-38617 | 5/1993 |
| JP | 6-175036 | 6/1994 |

OTHER PUBLICATIONS

Pedrotti et al., Introduction to Optics 1993, Prentice Hall, 2nd edition, pp. 40 and 41.*

* cited by examiner

Primary Examiner—Cassandra Spyrou
Assistant Examiner—Mark A. Robinson
(74) Attorney, Agent, or Firm—Frishauf, Holtz, Goodman, Langer & Chick, P.C.

(57) ABSTRACT

In the present invention, a transmission-illumination apparatus for use in a microscope has a transmission-illumination optical system comprising a condenser lens for radiating light emitted from a light source onto a sample, and an observation optical system including an objective lens for observing the sample. At least two shield members for controlling a shape of an aperture created in a pupil of the objective lens are disposed at or near positions conjugate with a pupil position of the objective lens. Thereby, a contrast can be successively varied without disposing a purpose-specific optical element, etc. in the observation optical system, and illumination with an optimal contrast can be provided for various samples.

14 Claims, 31 Drawing Sheets

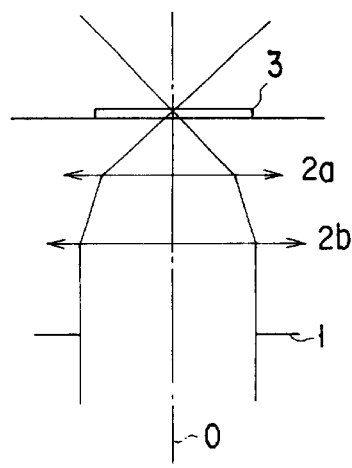
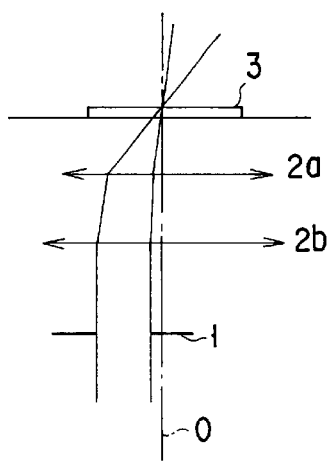
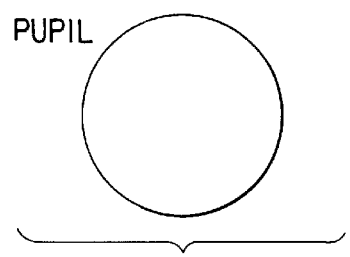
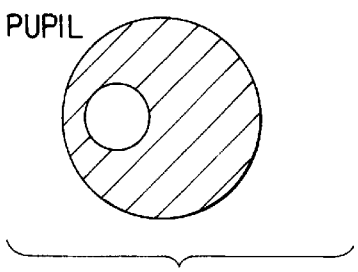
FIG. 1A (PRIOR ART)   FIG. 1B (PRIOR ART)
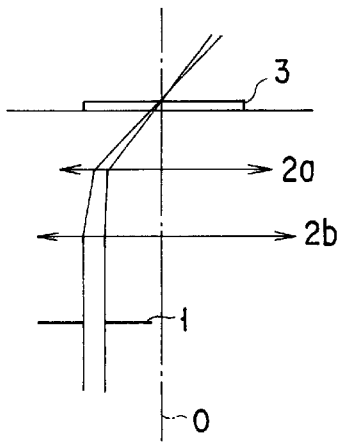
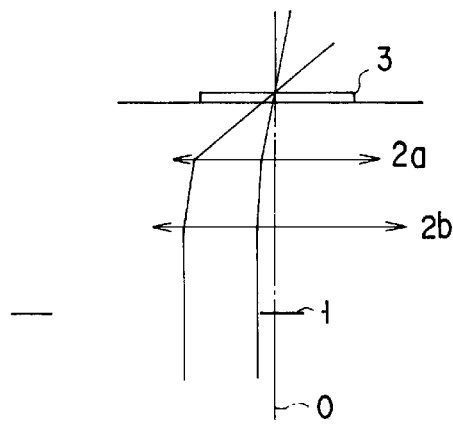
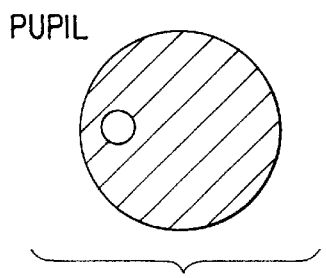
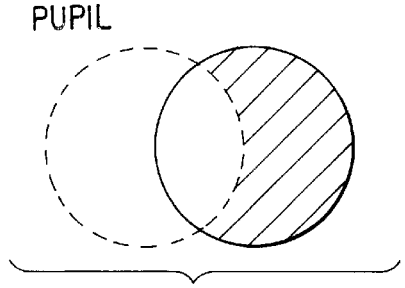
FIG. 1C (PRIOR ART)   FIG. 1D (PRIOR ART)

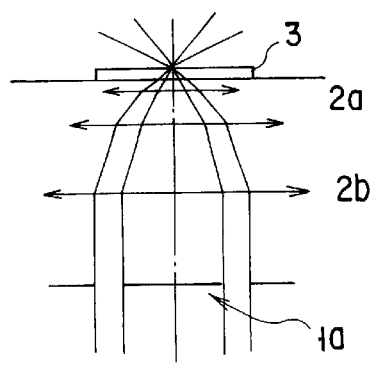
FIG. 2A (PRIOR ART)
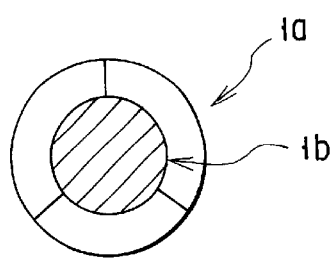
FIG. 2B (PRIOR ART)
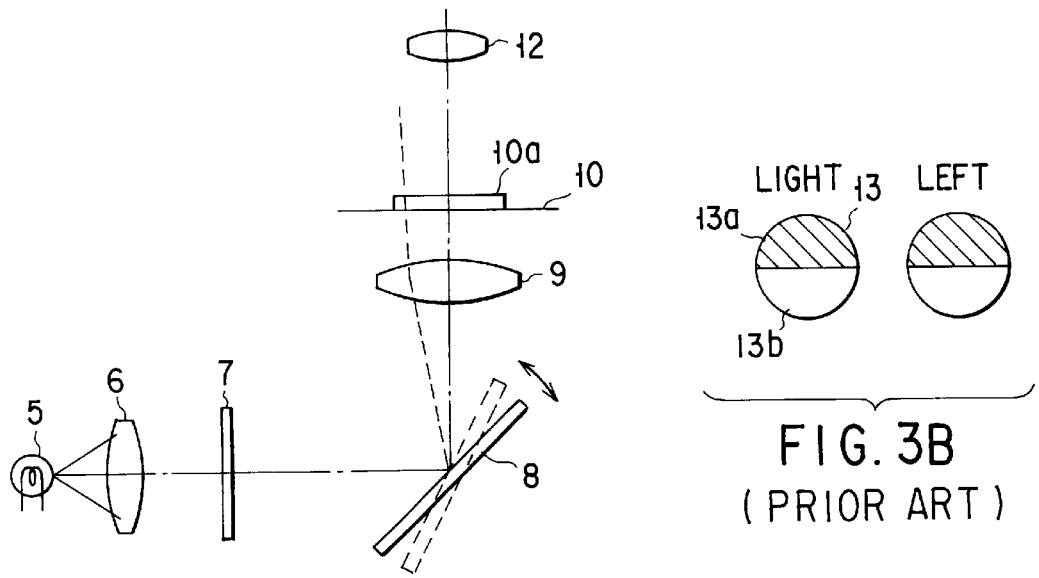
FIG. 3A (PRIOR ART)
FIG. 3B (PRIOR ART)
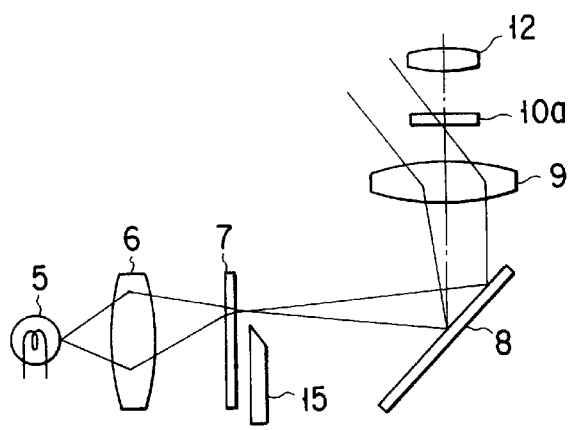
FIG. 4A (PRIOR ART)
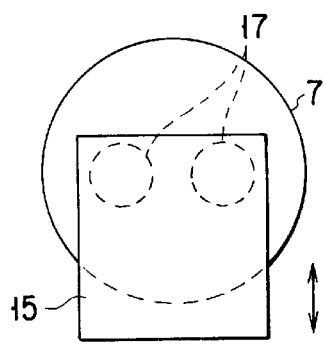
FIG. 4B (PRIOR ART)

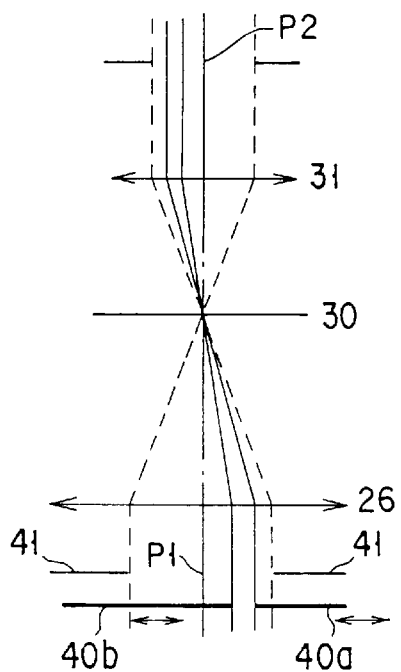
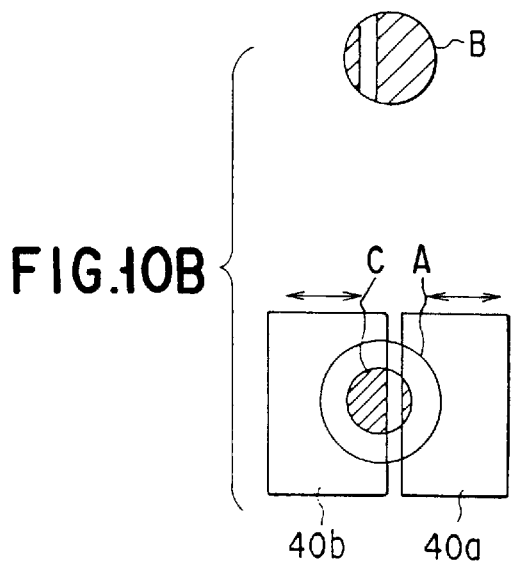
FIG. 10A
FIG. 10B
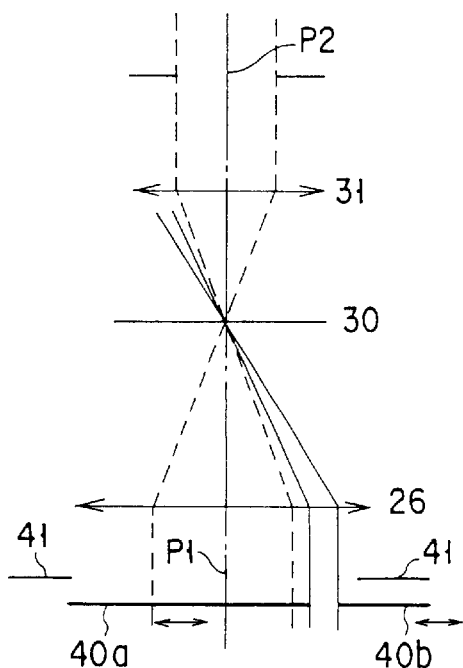
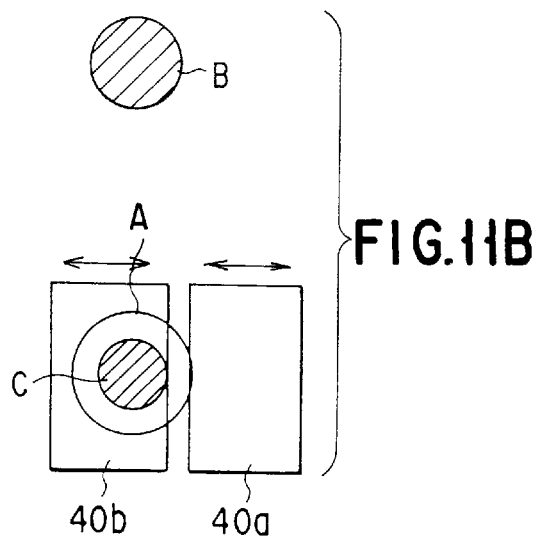
FIG. 11A
FIG. 11B

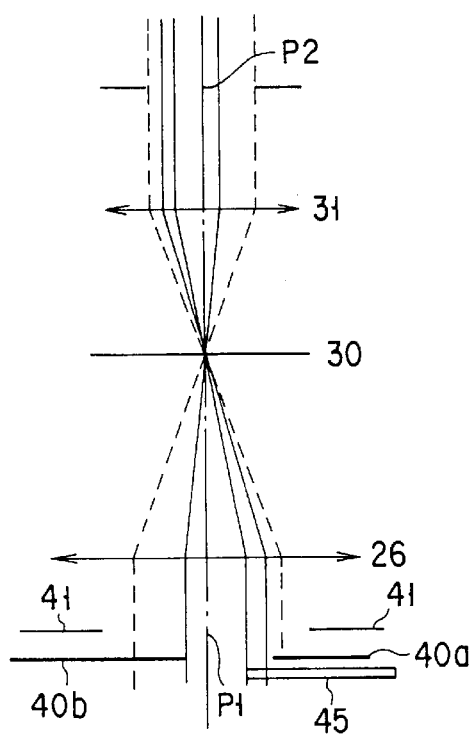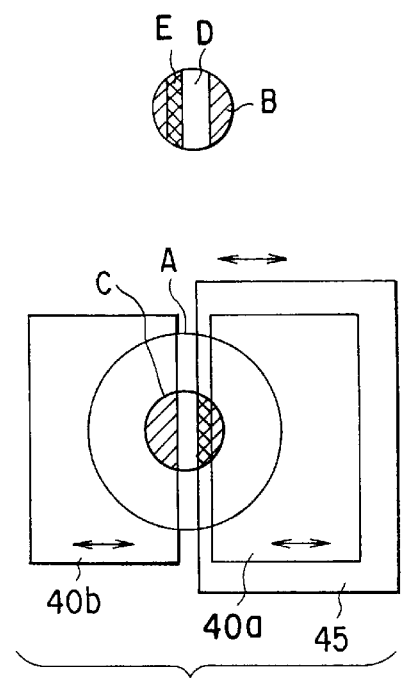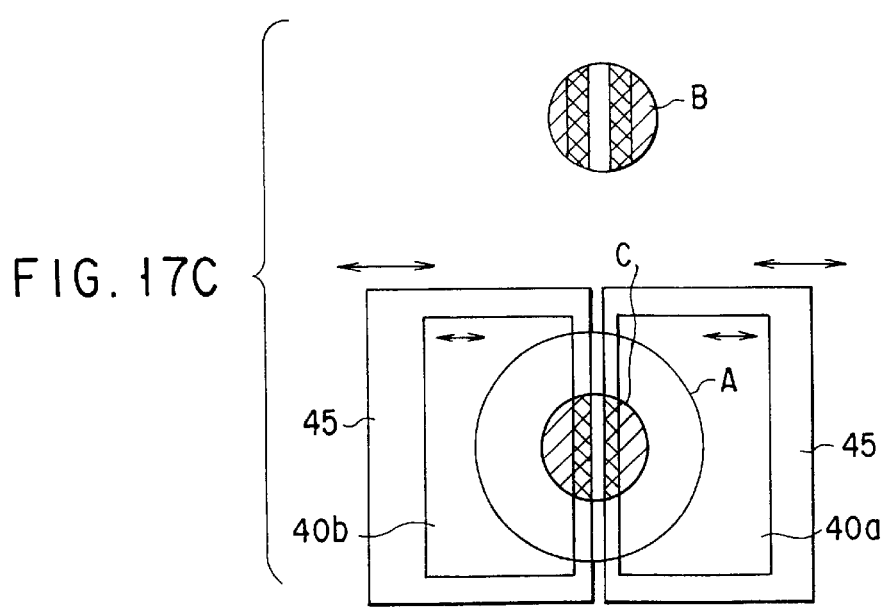
FIG. 17A
FIG. 17B
FIG. 17C

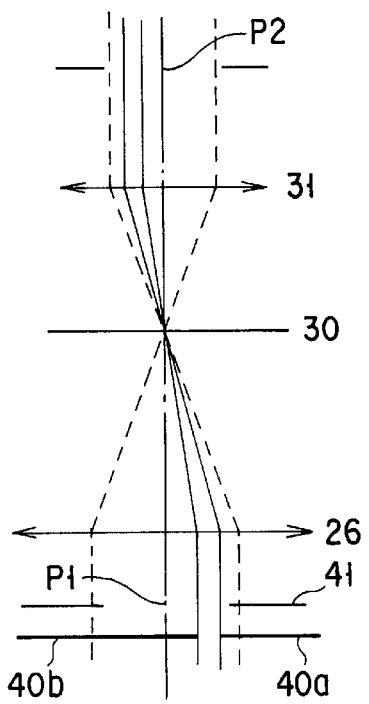
FIG. 25A
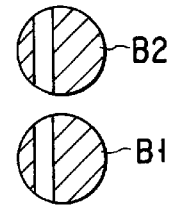
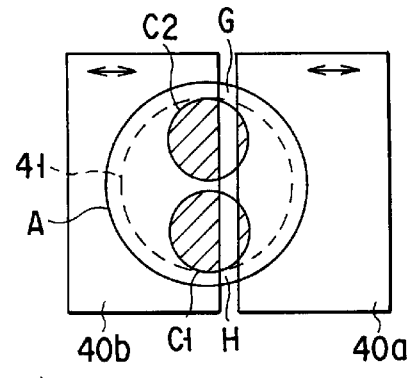
FIG. 25B
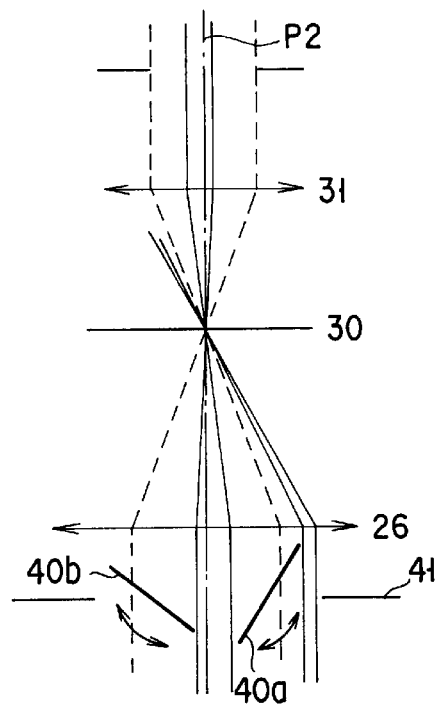
FIG. 26A
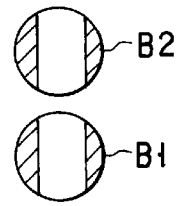
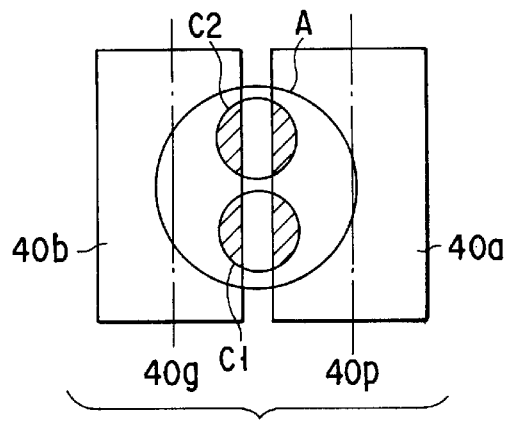
FIG. 26B

IN HIGH-
MAGNIFICATION MODE

IN LOW-
MAGNIFICATION MODE

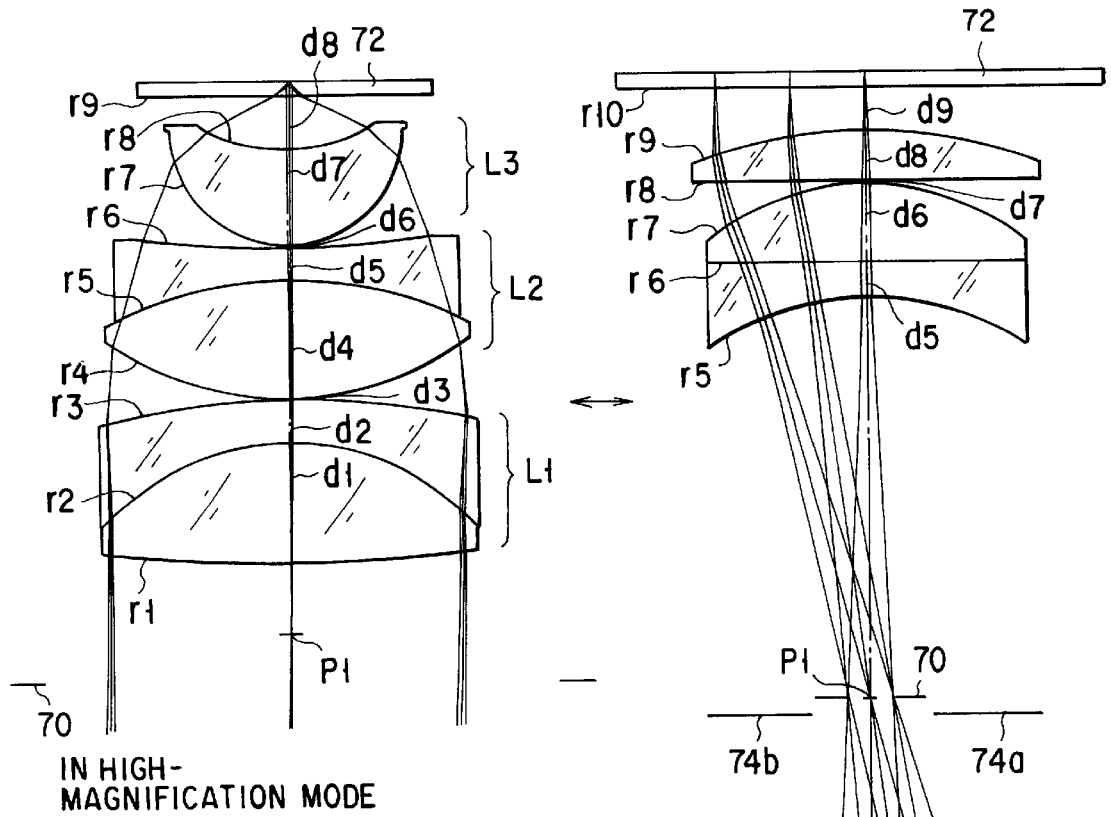
FIG. 35A  IN HIGH-MAGNIFICATION MODE
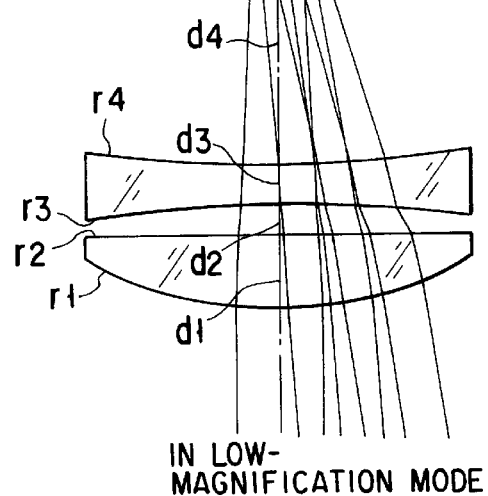
FIG. 35B  IN LOW-MAGNIFICATION MODE

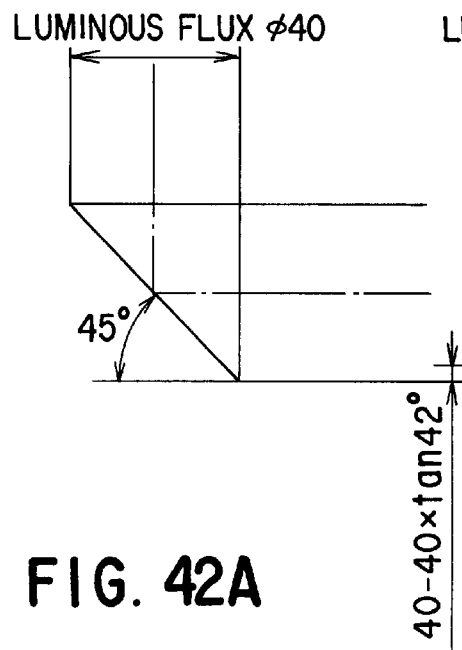
FIG. 42A
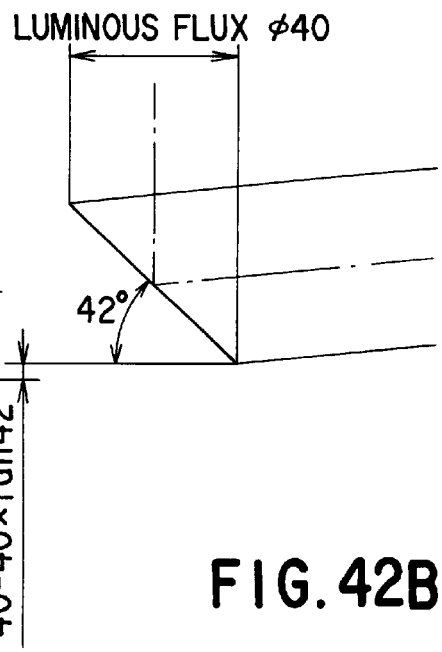
FIG. 42B
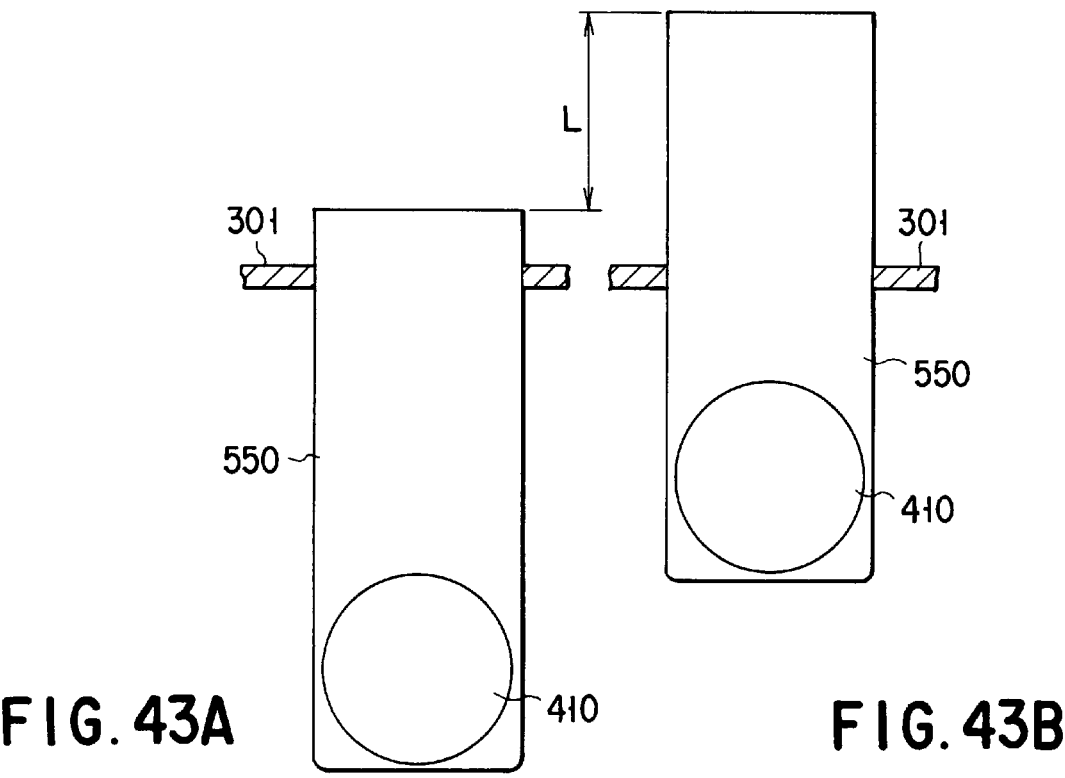
FIG. 43A
FIG. 43B

MICROSCOPE TRANSMITTED-ILLUMINATION APPARATUS

CROSS REFERENCE TO RELATED APPLICATIONS

This is a continuation of Application No. PCT/JP98/03853, filed Aug. 28, 1998.

This application is based upon and claims the benefit of priority from the prior Japanese Patent Applications No. 09-234070, filed Aug. 29, 1997; No. 09-234784, filed Aug. 29, 1997; and No. 10-240403, filed Aug. 26, 1998, the entire contents of which are incorporated herein by reference.

BACKGROUND OF THE INVENTION

The present invention relates to a transmitted-illumination apparatus applicable to various types of microscopes.

There are conventional methods, such as a phase-contrast observation method, a differential-interference observation method, a modulation-contrast method and an oblique illumination method, for visualizing various colorless transparent phase-samples and observing them.

In the phase-contract observation method, a ring slit is provided at a position of a pupil of an illumination optical system of a microscope. A phase film having a conjugate shape with the ring slit is disposed at a pupil of a focusing optical system provided at a position conjugate with the ring slit. An advantage of this observation method resides in that observation images with clear contrast can be obtained with high detection sensitivity, even for samples with a small difference in refractive index between structures, or minute granular structures of cells. On the other hand, a disadvantage of this observation method resides in that a phenomenon called "halo", in which an end portion of a structure of a sample looks shining in white, occurs and this makes it difficult to determine the contour of a structure. In addition, it is necessary that the ring slit provided in the illumination optical system and the phase film disposed at the pupil plane of the observation optical system be made to coincide by projection, thereby improving the is aberration performance of the pupil from the ring slit to the phase film plane. In the phase-contrast observation method, there arises no problem with the observation at a high magnification, but the aberration performance of the pupil for the observation at a low magnification or a very low magnification cannot satisfactorily be corrected. In fact, the phase-contrast observation method is applicable to objective lenses with a magnification of ×4 at most.

In the differential-interference observation method, two polarized light components crossing at right angles, which are produced by a birefringent crystal, are radiated on a sample plane with a slight displacement, and these light components are made to interfere with each other, thereby observing a minute structure of the sample. An advantage of this observation method resides in that stereoscopic observation with very high contrast can be performed. On the other hand, a disadvantage of this observation method is that the use of the birefringent crystal increases costs and because of use of polarized light, no exact observation image can be obtained in a case of a material which affects the polarized state. For example, a plastic Petri dish is unsuitable for the differential-interference observation. The reason is that polarized light is disturbed by birefringence of plastic material. In addition, the polarization state is disturbed by a distortion of a lens or an objective lens in the illumination optical system, a purpose-specific objective lens, etc. is needed. Moreover, since two light beams are subjected to interference, a lens capable of actual observation needs to have a magnification of ×4 or more, and this is not suitable for observation with a low magnification or a vary low magnification.

In the modulation-contrast observation method, as disclosed in Jpn. Pat. Appln. KOKAI Publication No. 51-128548, a slit is provided at a position of a pupil of an illumination optical system of a microscope, and a plurality of regions with different transmittances are provided at a position of a pupil of a focusing optical system. Normally, an absorption film having a proper transmittance is disposed at a region conjugate with the slit. A transmission region is provided on one side adjacent to the absorption film, and a light-shield region is provided on the other side. On a pupil plane, light transmission regions vary depending on a magnitude of refraction due to a structure in a sample, and a transmittance varies accordingly. Thus, a stereoscopic image with white/black shading can be obtained. An advantage of this observation method resides in that a stereoscopic image with shading on a phase object can be obtained with a relatively inexpensive structure. Since this method is free from halo, which occurs in the above-mentioned phase-contrast observation method, the contour of a structure can be easily observed and this method is suitable for manipulation of a cell, etc. On the other hand, a disadvantage of this observation method resides in that the detection sensitivity is lower than in the phase-contrast observation method and it is difficult to determine a minute structure. Moreover, a difficult operation for regulating the directions of the slit and absorption film needs to be performed each time the objective lens is exchanged. Besides, in order to project the slit onto the absorption film of the observation optical system, it is necessary to improve the aberration of the optical system for projecting the pupil, like the phase-contrast observation method. Because of this, with the objective lens of a low magnification or a very low magnification, the pupil aberration cannot satisfactorily be corrected and proper observation cannot be performed.

There are an oblique illumination method and a dark-field illumination method as illumination methods for visualizing phase-samples.

FIGS. 1A to 1D are schematic views of condenser lenses in general oblique illumination methods. In these figures, numeral 1 denotes an aperture stop; 2a, 2b lens groups; and 3 a sample. The aperture stop 1 limits the aperture for illumination and has a variable circular aperture. The aperture stop 1 moves in a plane perpendicular to an illumination optical axis O, thereby controlling the angle of illumination onto the sample 3. Specifically, FIG. 1B shows the state of the pupil in a case where the aperture stop 1 in the state shown in FIG. 1A has been moved and reduced. FIG. 1C shows the state of the pupil in a case where the aperture stop 1 has been further reduced. FIG. 1D shows the state of the pupil in a case where the aperture stop 1 has been shifted while being opened.

FIG. 2A is a schematic view of a condenser lens in a general dark-field illumination method. In the conventional dark-field illumination method, as shown in the figure, a stop 1a, which has an inside portion shut off and has an outside annular portion provided with a slit, is disposed near a location where an aperture stop is disposed. As is shown in FIG. 2B, the stop 1a has a central light-shield region 1b. The region 1b prevents illumination light from directly entering an objective lens. In addition, scattered light from the sample 3 is observed to realize dark-field observation. In this case, the shape of the stop 1a is selected in accordance with the numerical aperture of the objective lens, whereby dark-field observation can be made using various objective lenses.

As regards observation using microscopes, not only micro-regions but also macro-regions need to be observed. There are cases where the use of an objective lens with a magnification of ×1, an objective lens with a very low magnification of ×0.5, etc. is desired. In general, a stereomicroscope is used for observing such macro-regions. The stereomicroscope is advantageous in that the cost is low, the operability is high and stereoscopic observation can be performed. In addition, as regards illumination methods, there are means, such as dark-field illumination, bright-field illumination and oblique illumination, for visualizing transparent samples such as phase samples.

Jpn. Pat. Appln. KOKAI Publication No. 4-318804 discloses a transmission-illumination apparatus for a stereomicroscope, which permits oblique illumination. FIG. 3A shows the transmission-illumination apparatus disclosed in this publication. As is shown in FIG. 3A, this apparatus is constructed such that light from a light source 5 is guided to a mirror 8 via a collector lens 6 and a frosted glass 7, and a light beam reflected by the mirror 8 is radiated via a condenser lens 9 onto a sample 10a placed on a sample-mounting transparent member 10 and then guided to an objective lens 12. By rotating the mirror 8 and changing the angle thereof, the ratio between a dark portion 13a and a bright portion 13b of a pupil 13 of each of right and left objective lenses, as shown in FIG. 3B, can be controlled.

Jpn. U.M. Appln. KOKOKU Publication No. 41-5808 discloses a transmission-illumination apparatus for a stereomicroscope capable of selectively effecting oblique illumination and dark-field illumination. FIGS. 4A and 4B are views for describing this apparatus. As is shown in FIG. 4A, this apparatus is constructed such that light from a light source 5 is guided to a mirror 8 via a collector lens 6 and a frosted glass 7, and light reflected by a mirror 8 is radiated via a condenser lens 9 onto a sample 10a and then guided to an objective lens 12. A knife edge 15 for cutting a light beam is provided near the frosted glass 7 disposed at a position conjugate with the pupil of the objective lens 12.

As is shown in FIG. 4B, the knife edge 15 is vertically moved relative to a conjugate image 17 of the pupils of the two juxtaposed objective lenses, whereby oblique illumination and dark-field illumination is selectively effected. The aforementioned Jpn. Pat. Appln. KOKAI Publication No. 4-318804 proposes that a stop be substituted for the knife edge 15 shown in FIG. 4A.

A purpose-specific observation optical system is required for the above-described phase-contrast observation method, differential-interference observation method and modulation-contrast observation method which can perform observation of a transparent object such as a phase sample. It is also necessary, for example, to correct the optical performances of the illumination optical system and the pupil projection optical system of the observation optical system. Thus, these methods are not suitable for observation with a low magnification or a very low magnification.

In the oblique-illumination method shown in FIG. 1A, if the aperture stop 1 is shifted and reduced, as shown in FIG. 1C, the resolution and the luminance of illumination light become deficient. If the aperture stop 1 is shifted, as shown in FIG. 1D, it becomes difficult to control the degree of freedom of oblique illumination, i.e. the ratio between illumination light directly incident on the objective lens and non-incident illumination light. The reason is that the aperture stop is constructed to form a circular opening.

In addition, in the dark-field illumination illustrated in FIG. 2, the angle of dark-field illumination light varies depending on the width of the annular slit or the position of the aperture. Consequently, if the thickness, etc. of the sample varies, the sample cannot be made visible with good contrast. Specifically, in order to freely control the angle of illumination light, it is necessary to prepare many annular slits with different structures, and this is not practical.

Moreover, as regards the oblique illumination method proposed in the above-described stereo-microscope, only one of the pupils of the right and left objective lenses is illuminated. Thus, only one kind of contrast is obtained. Although the effect of oblique illumination can be obtained by disposing the slit at the pupil of the illumination optical system and thereby restricting the aperture of the pupil of the objective lens, the shape of the slit or the position of the slit is fixed in the prior art. It is thus not possible to freely and finely control the intensity of illumination light or the angle of illumination, depending on the thickness and refractive index of various samples.

As has been described above, with the conventional illumination apparatus for microscopes, phase-samples cannot satisfactorily be made visible with high contrast in observation with a low or very low magnification.

Recently, stereomicroscopes have been constructed as systems, and a wide range of magnification is required. In addition, high operability is required. In order to meet a demand for use with a wide range of magnification, it is necessary to achieve uniform illumination over a wide visual field. In view of easier use, a sample plane needs to be situated at a level as low as possible.

In the above-described prior art, the frosted glass (diffusion plate) needs to be enlarged in order to increase the visual field, and the deflecting mirror, too, needs to be enlarged. Because of this, the thickness of the illumination optical system increases, and both a demand for a wider visual field and a demand for a low-level sample plane cannot be satisfied.

Jpn. U.M. Appln. KOKOKU Publication No. 45-1105 discloses an illumination apparatus capable of performing bright-field illumination and dark-field illumination, as shown in FIG. 5. In this illumination apparatus, a light source 100 is disposed under an objective lens 101 and a sample 102. In the dark-field illumination mode, a shutter 103-is closed to shut off direct light traveling to the sample 102. In addition, light from the light source 100 is reflected by a cylindrical mirror 105 and made obliquely incident on the sample 102. In the bright-field illumination mode, the shutter 103 is opened and light from the light source 100 is made directly incident on the sample.

In this illumination apparatus, however, the light source is disposed vertical to the sample. Consequently the optical path is short and, no space is left for mounting optical members such as a filter. If an optical member is to be disposed on the optical path, the thickness of the apparatus with this structure is increased. Furthermore, since the optical path is short, the wide visual field cannot uniformly be illuminated.

BRIEF SUMMARY OF THE INVENTION

An object of the present invention is to provide an illumination apparatus for a microscope, wherein a phase-sample is visualized with a good contrast without disposing a purpose-specific optical element, etc. in an observation optical system, in particular, in a region of a low magnification to a very low magnification, and a structure and a distribution thereof can be specified. Specifically, a transmission-illumination apparatus is provided wherein a contrast is successively varied for various samples with different thicknesses and refractive indices and optimal illumination is performed for the samples.

Another object of the invention is to provide a transmission-illumination apparatus wherein a sample-mounting surface can be set at a low level, that is, a height between a bottom surface of a microscope body and the sample-mounting surface can be reduced.

Still another object of the invention is to provide a transmission-illumination apparatus wherein a bright-field optical system and a dark-field optical system can be switched to observe a sample and a height between a bottom surface of a microscope body and a sample-mounting surface can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A to FIG. 1D schematically show condenser lenses in general oblique-illumination methods and aperture shapes of pupils created by aperture stops thereof;

FIG. 2A schematically shows a condenser lens in a general dark-field illumination method, and FIG. 2B shows a shape of a stop;

FIG. 3A shows a schematic structure of a conventional transmission-illumination apparatus, and FIG. 3B shows aperture shapes of pupils of right and left objective lenses;

FIG. 4A shows a schematic structure of another conventional transmission-illumination apparatus, and FIG. 4B shows a relationship between a knife edge and pupils of right and left objective lenses;

FIG. 10A shows a state in which the shield member has been shifted in the structure shown in FIG. 9A, and FIG. 10B shows a state of a pupil at that time;

FIG. 11A shows a state in which the shield member has been shifted in the structure shown in FIG. 9A, and FIG. 11B shows a state of a pupil at that time;

FIG. 17A and FIG. 17B show a structure for partly controlling light intensity for an aperture created at the pupil of the objective lens, FIG. 17A schematically showing an optical system, FIG. 17B showing a relationship between the shield member and the pupil, and FIG. 17C shows another example of the structure of the shield member portion;

FIG. 25A and 25B show another example of the structure for controlling an aperture shape created at the pupil of the objective lens in the stereo-microscope, FIG. 25A schematically showing an optical system, FIG. 25B showing a relationship between the shield member and,the pupil;

FIG. 26A and FIG. 26B show another example of the structure for controlling an aperture shape created at the pupil of the objective lens in the stereo-microscope, FIG. 26A schematically showing an optical system, FIG. 26B showing a relationship between the shield member and the pupil;

FIG. 35A and FIG. 35B show second structures of switchable condenser lenses for use in the microscope transmission-illumination apparatus, FIG. 35A showing a structure of a high-magnification condenser lens, FIG. 35B showing a structure of a low-magnification condenser lens;

FIGS. 42A and 42B are views for describing the operational advantage of the third embodiment;

FIGS. 43A and 43B show a modification of the filter insert/remove mechanism;

DETAILED DESCRIPTION OF THE INVENTION

Embodiments of the present invention will now be described by referring to ordinary microscopes as examples.

Figure 7:
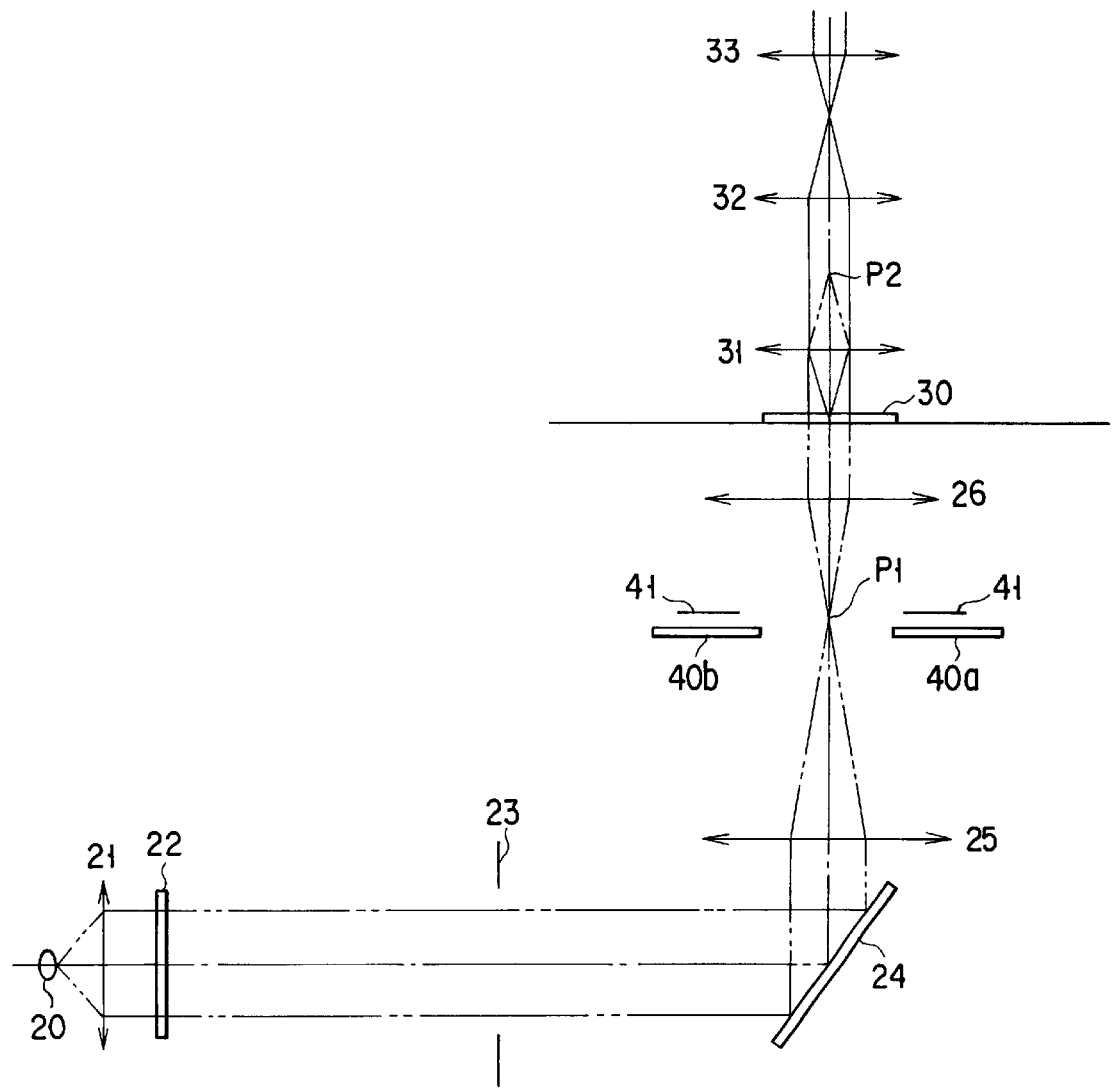
FIG. 7 shows a schematic structure of an optical system of the stereomicroscope shown in FIG. 6.

FIG. 7 schematically shows a structure of an optical system of a microscope. The optical system comprises a transmission-illumination optical system for illuminating a sample, and an observation optical system for observing the sample.

The transmission-illumination optical system comprises a light source 20 such as a halogen lamp; a collector lens 21 for converting light from the light source 20 into a substantially parallel light beam; a diffusion plate (frosted glass) 22 for diffusing light from the collector lens; a field stop 23 for limiting the light beam emanating from the diffusion plate; a deflection mirror 24 for deflecting upward the light beam which has passed through the field stop; a projection lens 25 for projecting a light-source image from the deflection mirror; and a condenser lens 26 for converting the light from the projection lens into a substantially parallel beam and illuminating a sample 30. In this case, the light-source image from the projection lens 25 is projected onto a pupil position P1 of the transmission-illumination optical system, which is located at a front-side focal position of the condenser lens 26, thereby illuminating the sample 30.

The observation optical system comprises an objective lens 31, a focusing lens 32 and an eyepiece lens 33. A focal position P2 of the objective lens 31, which is a pupil position of the observation optical system, is conjugate with the pupil position P1 which is the focal position of the condenser lens. The light which has passed through the sample 30 is observed by means of the eyepiece lens 33 via the objective lens 31 and focusing lens 32.

In the transmission-illumination optical system with the above structure, at least two shield members 40a and 40b are disposed to be independently movable at a position (i.e. pupil position P1) conjugate with the pupil position P2 of the objective lens 31 or near the conjugate position. By shifting the shield members 40a, 40b, the shape of the aperture created within the pupil of the objective lens 31 is controlled, as will be described later in detail. Specifically, the angle of illumination light for illuminating the sample 30 can be varied to control the ratio between the illumination light directly entering the objective lens 31 and the diffraction light emanating from the sample 30.

This will be described specifically with reference to FIGS. 8A to 11B. In these figures, FIGS. 8A, 9A, 10A and 11A schematically show optical systems, and FIGS. 8B, 9B, 10B and 11B show positional relationships between pupils and shield members in microscopes. A circle indicated by symbol A represents a pupil with a maximum numerical aperture at which the condenser lens 26 can perform illumination. A circle indicated by symbol C represents a pupil corresponding to a numerical aperture of the objective lens 31 of the microscope at the pupil position P1 of the condenser lens 26. A circle indicated by symbol B represents a light incidence state (aperture shape; a black portion being shielded by shield member 40a, 40b) at the pupil position of the objective lens 31.

Figure 8A:
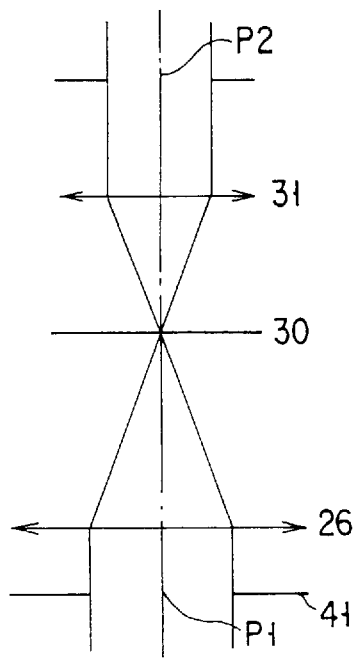
FIG. 8A schematically shows portions of a condenser lens and an objective lens in a bright-field illumination state.
Figure 8B:
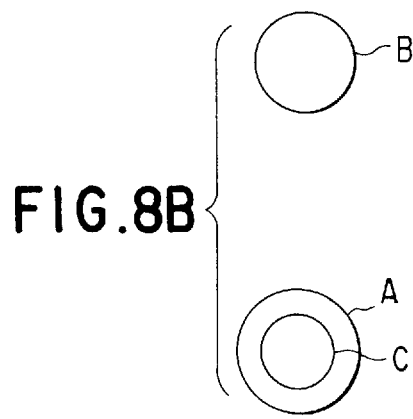
FIG. 8B shows a state of a pupil at that time.

FIGS. 8A and 8B indicate states in which no shield member is present, that is, so-called bright-field illumination states. In this structure, at least two shield members 40a and 40b, as shown in FIG. 7, are disposed to be independently movable at a pupil position P1 of the condenser lens 26, or near this position (±several mm from pupil position P1 in the optical axis direction). In this case, aperture stop 41 may be disposed adjacent to the shield members.

Figure 9A:
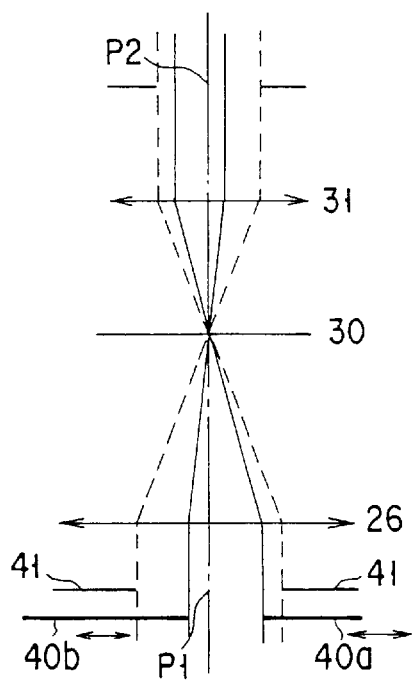
FIG. 9A schematically shows portions of a shield member, a condenser lens and an objective lens in the optical system shown in FIG. 7.
Figure 9B:
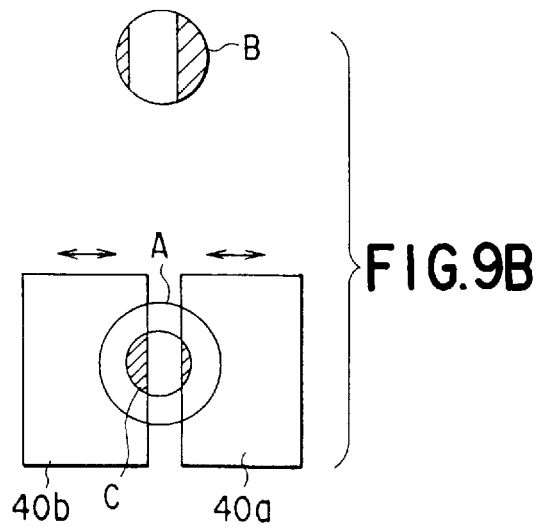
FIG. 9B shows a state of a pupil at that time.
Figure 12A:
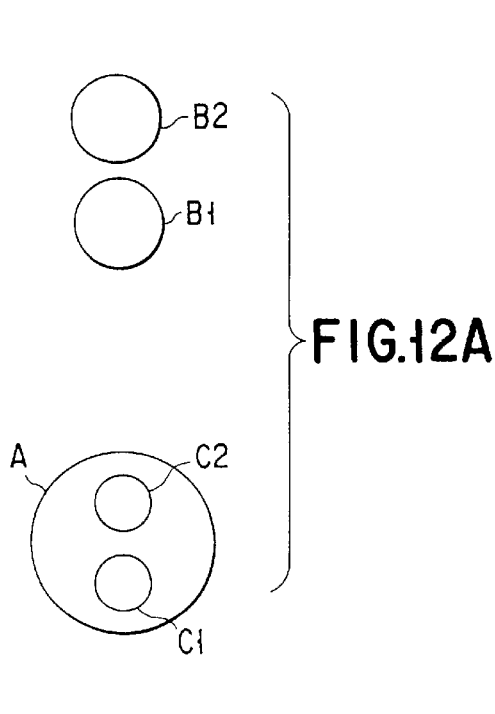
FIG. 12A to FIG. 12D correspond to FIG. 8B to FIG. 11B and show positional relationships between the pupil and shield member in the case where the optical system shown in FIG. 7 is applied to the stereomicroscope.
Figure 12B:
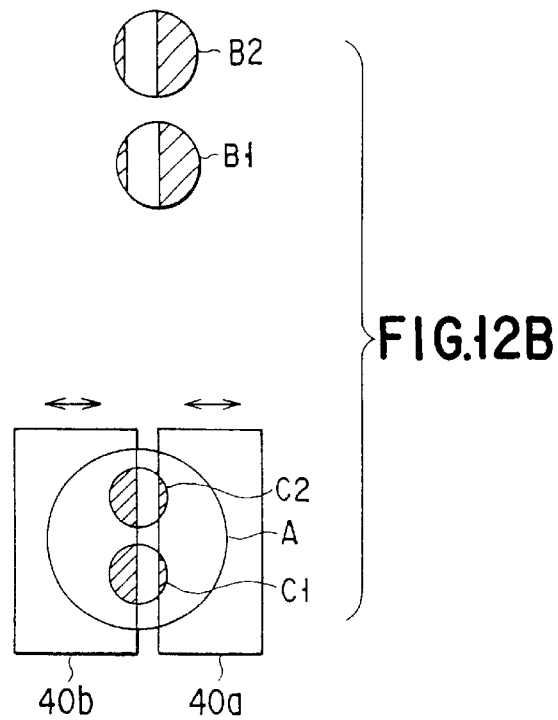
Figure 12C:
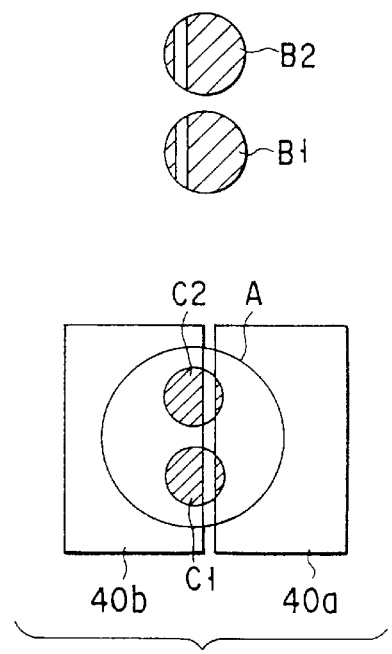
Figure 12D:
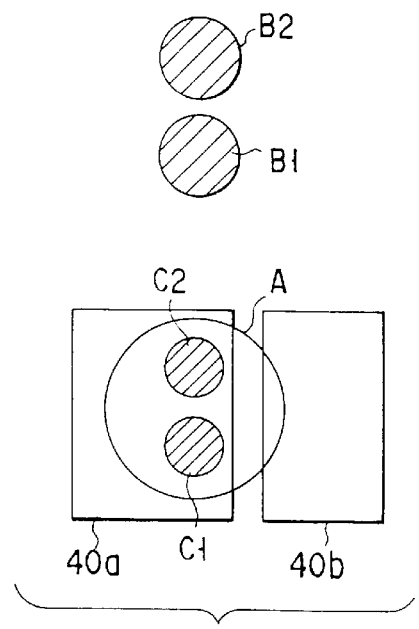

There are at least two shield members. The shape of each shield member, the number of shield members, and the method of movement thereof can be variously determined. For example, as shown in FIG. 8A, each shield member may have a rectangular shape, and the shield members may be shifted independently, as indicated by arrows, to shut off the pupil C. Specifically, if the shield members 40a and 40b are positioned, as shown in FIG. 9A and FIG. 9B, the aperture shape (illumination state) represented by pupil B is obtained. In the figures, a region (hatched) shut off by the shield member 40a corresponds to a left-side black region in the pupil B, and a region shut off by the shield member 40b corresponds to a right-side black region in the pupil B.

FIG. 10B shows a state in which the shield member 40b has been further shifted toward the shield member 40a from the state shown in FIG. 9B and the distance therebetween narrowed. As is indicated by the aperture shape in the pupil B in this state, the illumination light directly entering the sample 30 is only that in the narrow region (the narrow upper region of the filed of view when observation is performed using a microscope shown in FIG. 6) in the left side of the pupil B in the figure. The effect of oblique illumination is obtained by independently shifting the shield members 40a and 40b, and the effect of the luminance stop is obtained by varying the distance between the shield members 40a and 40b. The shape of the aperture created in the pupil of the objective lens can be controlled by freely shifting the shield members 40a and 40b. Specifically, since the angle and amount of illumination light for illuminating the sample 30 are successively varied, the ratio in intensity between the illumination light directly entering the objective lens and the diffraction light emanating from the sample can be successively controlled. Optimal observation can be performed according to the sample.

If the shield members 40a and 40b are shifted to shut off the pupil C, as shown in FIG. 11B, direct light incident on the objective lens can be cut to achieve dark-field illumination for observing scattered light from the sample. In this case, the amount and angle of dark-field illumination light can be controlled by varying the distance between the shield members and the position of each shield member in the state in which the pupil C is shut off.

The above optical system is applicable to a stereomicroscope. FIGS. 12A to 12D correspond to FIGS. 8B, 9B, 10B and 11B and show positional relationships between the pupils and shield members in the case where the above-described optical system is applied to a stereomicroscope. In FIGS. 12A to 12D, circles denoted by symbols C1 and C2 represent pupils corresponding to the apertures of the right and left objective lenses of the stereomicroscope. Circles denoted by symbols B1 and B2 represent light incidence states at the pupil positions of the right and left objective lenses.

Figure 5:
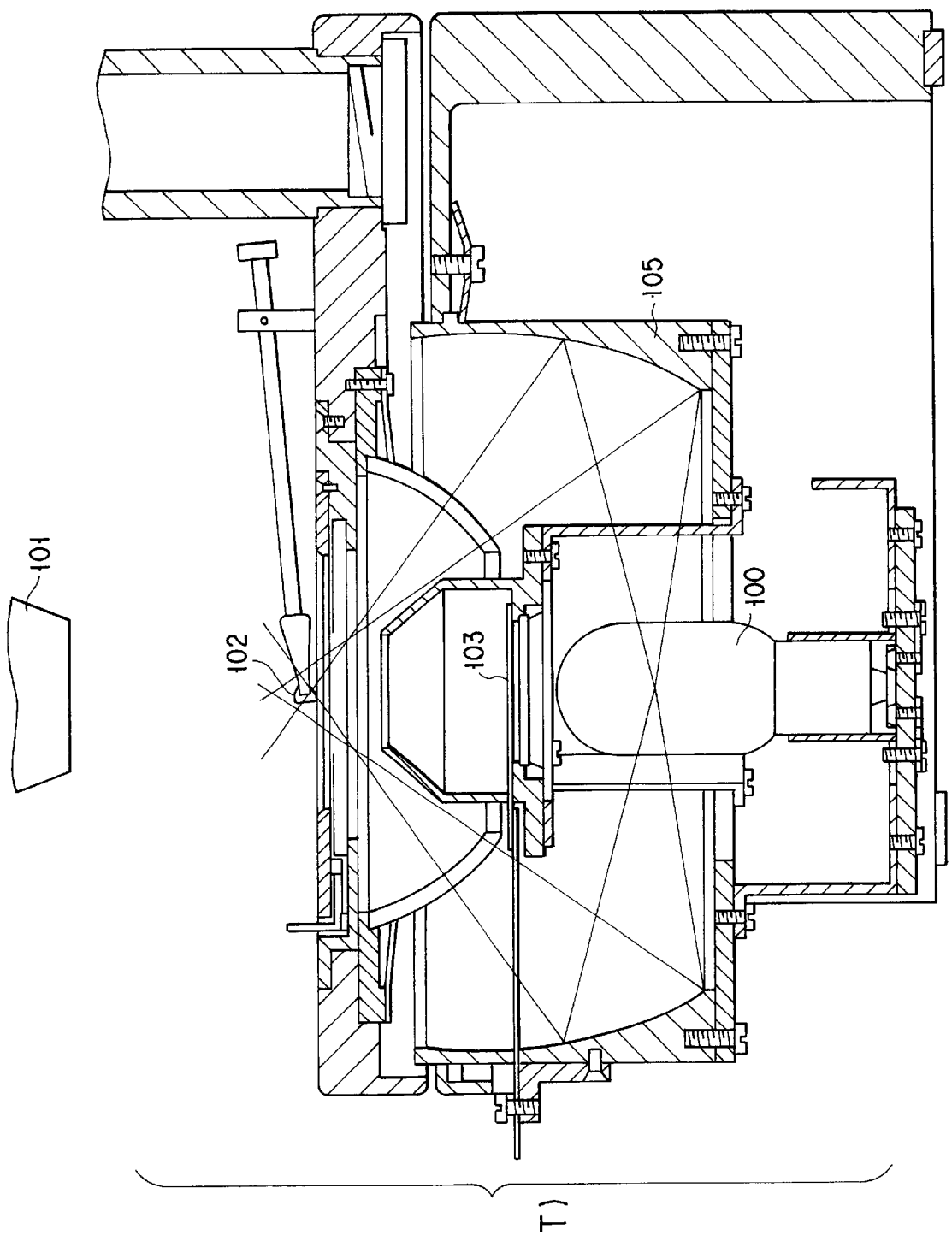
FIG. 5 shows a conventional microscope wherein a bright-field illumination apparatus and a dark-field illumination apparatus can be switched.
Figure 6:
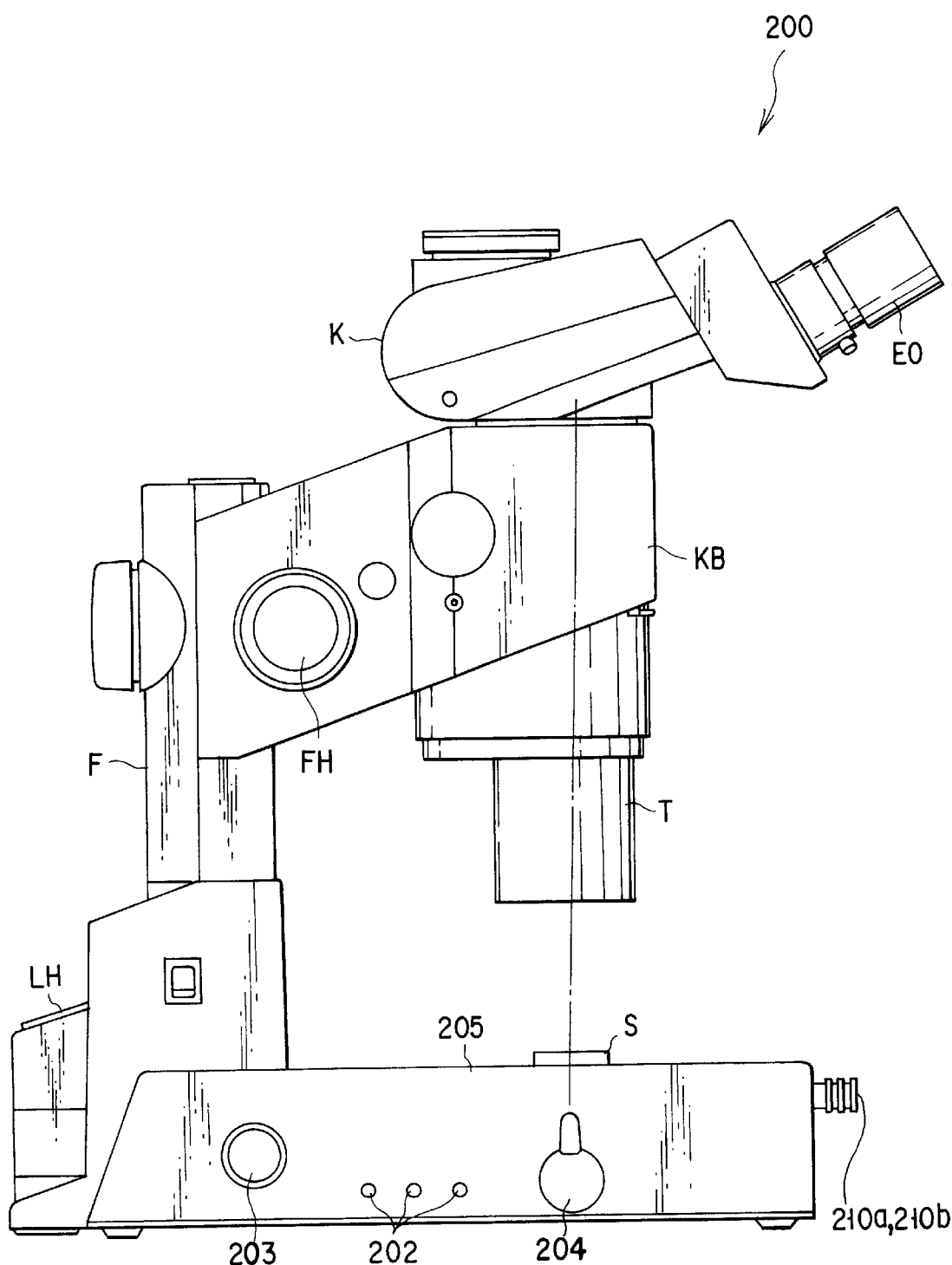
FIG. 6 show an external appearance of a stereomicroscope to which a transmission-illumination apparatus according to the present invention is applicable.

A description will now be given of an example of the structure wherein the transmission-illumination apparatus according to the present invention has been applied to the stereomicroscope. FIG. 6 is a side view of the entire structure of the stereomicroscope. The stereomicroscope 200 comprises a transmission-illumination frame 205 having a lever 210a (210b) (to be described later) for switching shield members, filter levers 202, a volume dial 203 and a mirror-inclination adjustment lever 204 which is provided where necessary; a lamp house LH; a focusing section F; a focusing handle FH; a lens-barrel K; a lens body KB; an objective lens receiver T; and eyepiece lenses EO. A sample S is placed on the surface of the transmission-illumination frame and it is observed by means of two right and left eyepiece lenses EO.

A driving mechanism for the shield members 40a and 40b will now be described with reference to FIGS. 13 to 16.

Figure 13:
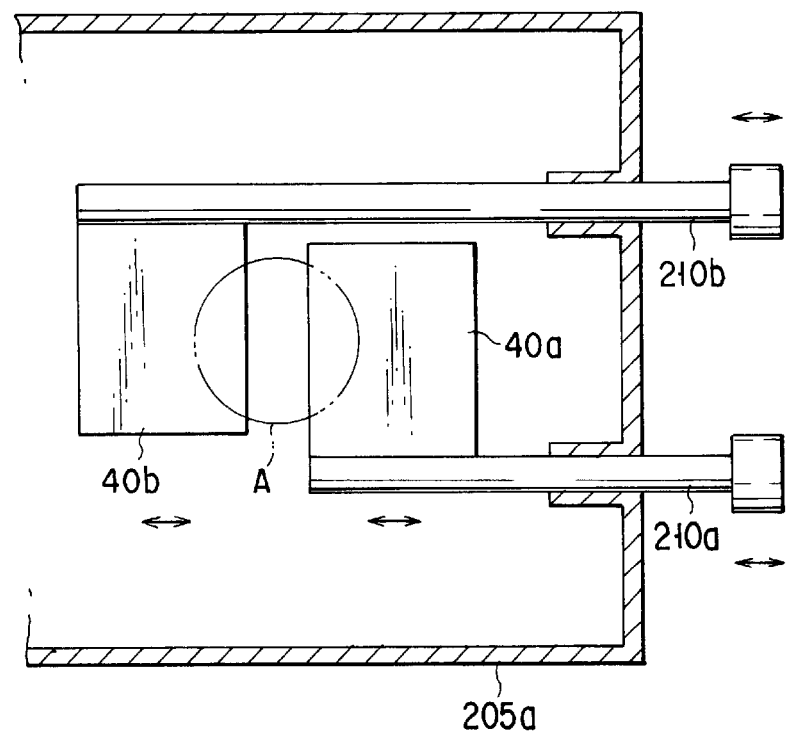
FIG. 13 shows an example of a shield member driving mechanism provided within the microscope body.

As is shown in FIG. 13, shield members 40a and 40b are attached to inside portions of distal end portions of two slidable levers 210a and 210b, which are individually penetrated through a wall of a frame body 205a of the transmission-illumination frame 205 shown in FIG. 6. The levers 210a and 210b are independently operable in directions of arrows. Thereby, as shown in FIGS. 9 to 11, the shield members 40a and 40b can be moved in a direction (a front-and-rear direction in respect of the observer) perpendicular to a direction parallel to a plane including optical axes of the right and left observation optical systems. A translation mechanism (not shown) may be provided at rear end portions of the levers 210a and 210b such that both shield members are interlocked.

Figure 14:
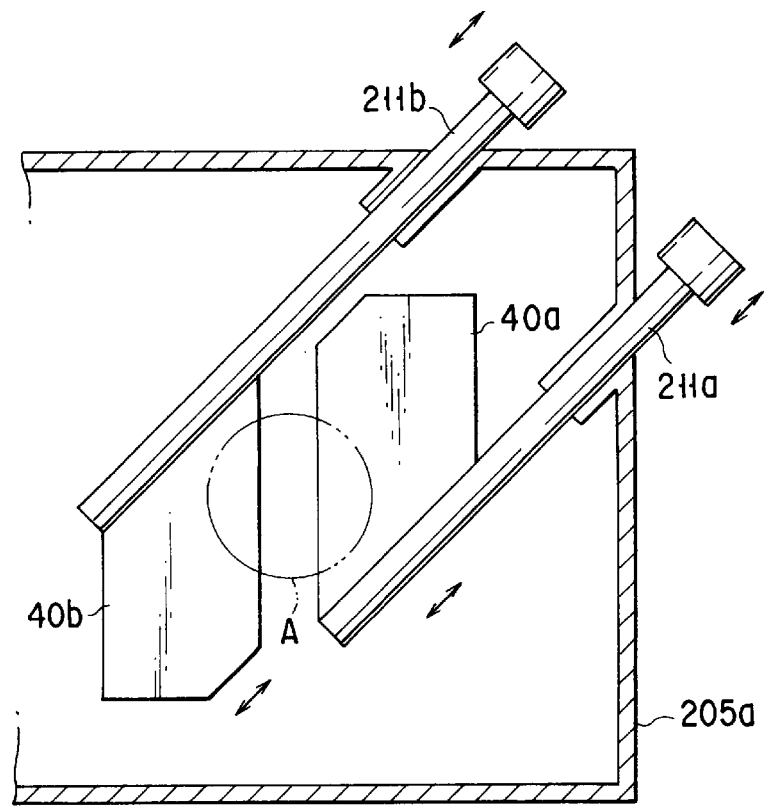
FIG. 14 shows a second example of the structure of the shield member driving mechanism.

FIG. 14 shows a second example of the structure of the shield members and the driving mechanism therefor.

Shield members 40a and 40b are attached to inside portions of distal end portions of two levers 211a and 211b, which are independently slidable in the directions of arrows and are individually penetrated obliquely through a side wall of the frame body 205a. Like this example, the operation lever for moving each shield member can be attached at a given position of the side wall of the frame body 205a, and the shape of each shield member can be freely changed in accordance with the position of attachment (a pentagonal shape in the figure). In this example of the structure, too, a translation mechanism may be provided at rear end portions of the levers 211a and 211b such that both shield members are interlocked.

Figure 15A:
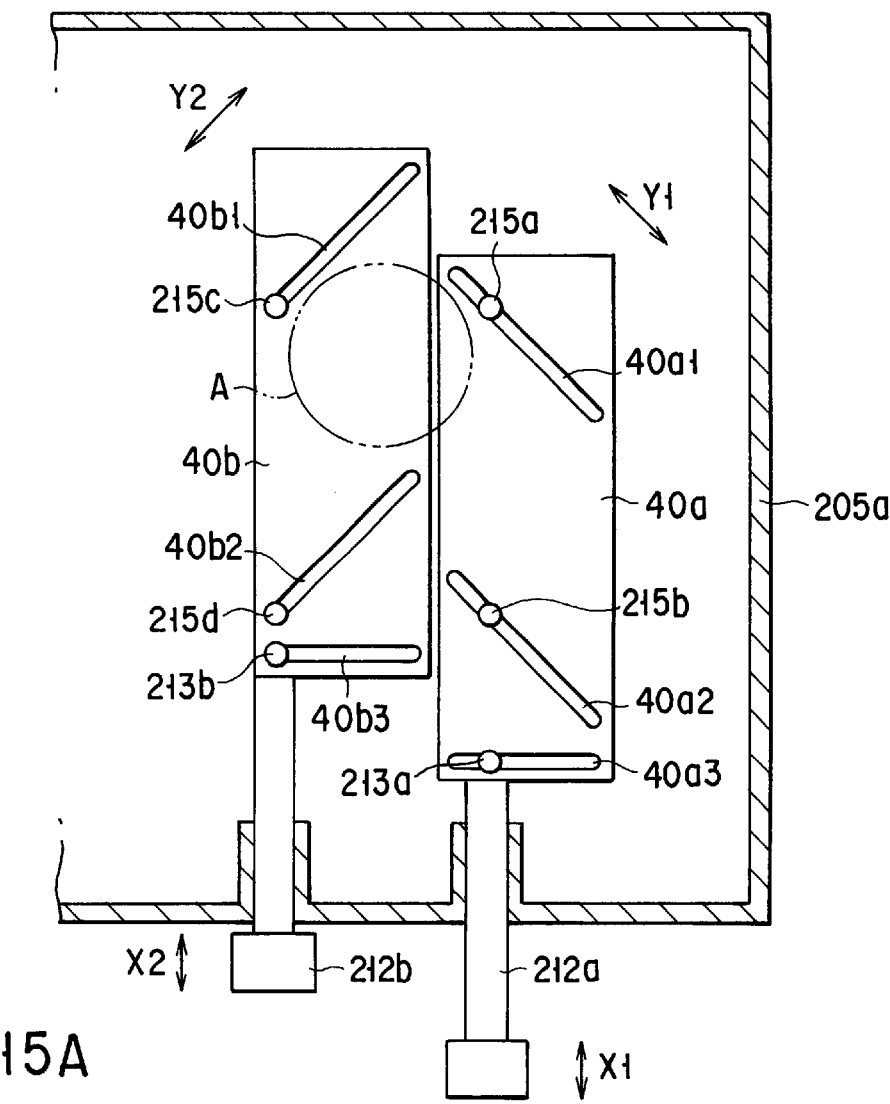
FIGS. 15A and 15B show a third example of the structure of the shield member driving mechanism, FIG. 15A being a plan view, FIG. 15B being a side view.
Figure 15B:
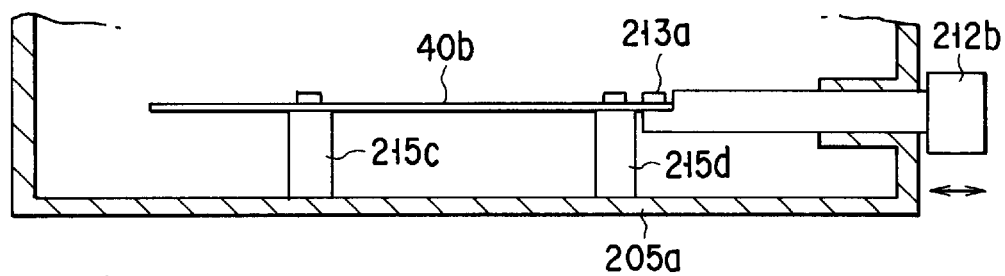

FIGS. 15A and 15B show a third example of the structure of the shield members and the driving mechanism therefor. FIG. 15A is a plan view, and FIG. 15B is a side view.

As is shown in the figures, shield plates 40a and 40b are provided respectively with slots 40a1, 40a2 and 40b1 and 40b2 extending obliquely (directions Y1 and Y2) as well as slots 40a3 and 40b3 extending in the right-and-left direction.

Two slidable levers 212a and 212b are individually penetrated through a side wall of the frame body 205a. Pins 213a and 213b engaging the slots 40a3, 40b3 formed in the shield members 40a, 40b are formed at distal end portions of the levers. Links 215a, 215b, 215c and 215d engaging the slots 40a1, 40a2 and 40b1, 40b2 formed in the shield members 40a, 40b are provided on a bottom surface of the frame body 205a.

Thus, if the levers 212a and 212b are inserted and withdrawn in the directions X1 and X2, the shield members 40a and 40b are moved in the directions Y1 and Y2 along the slots and also moved in the right-and-left direction relative to each other.

Figures 16A, 16B:
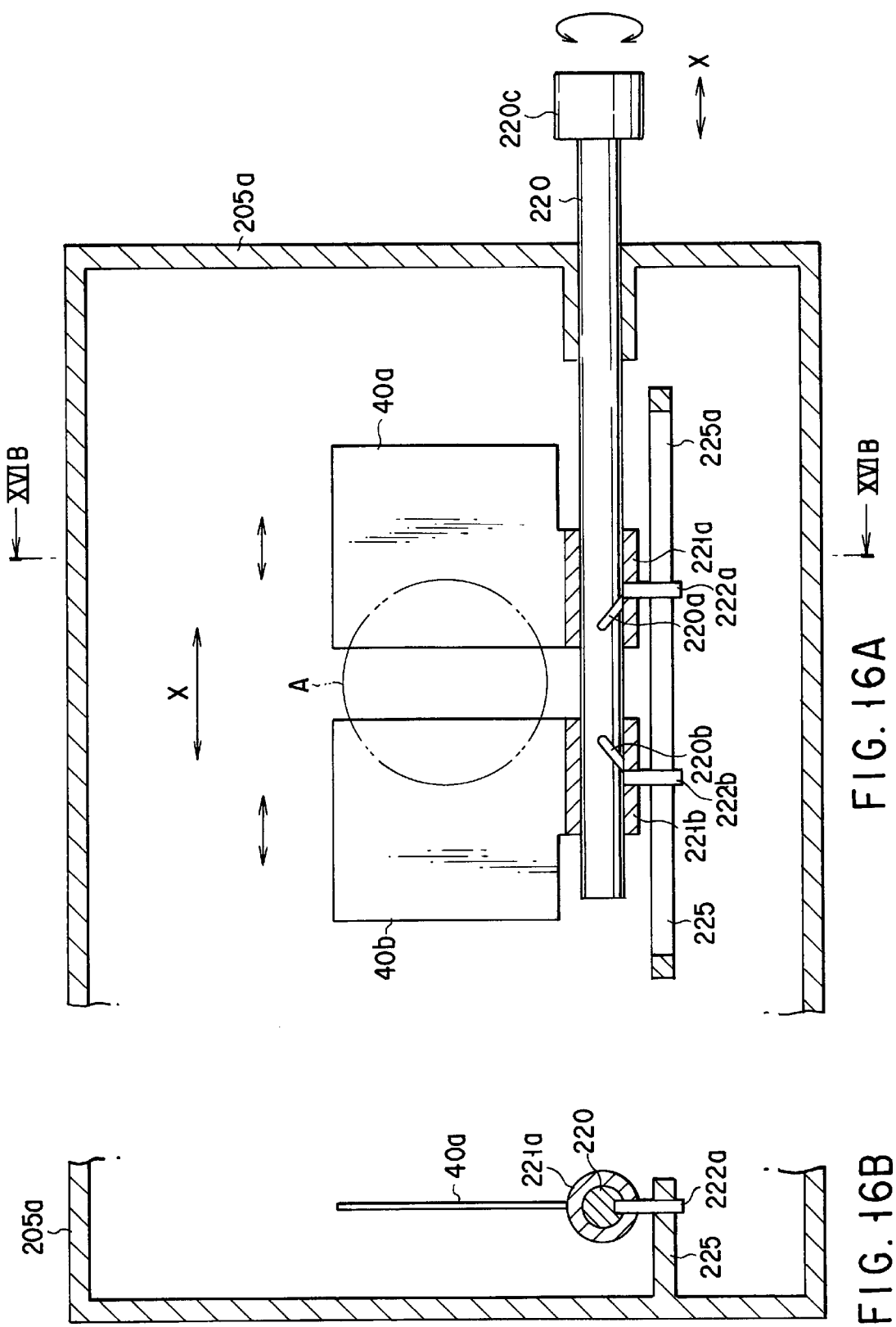
FIGS. 16A and 16B show a forth example of the structure of the shield member driving mechanism, FIG. 16A being a plan view, FIG. 16B being a cross-sectional view taken along line XVIB—XVIB in FIG. 16A.

FIGS. 16A and 16B show a forth example of the structure of the shield members and the driving mechanism therefor. FIG. 16A is a plan view, and FIG. 16B is a side view. This driving mechanism includes a cam mechanism in addition to the above-described link mechanism.

An axially movable and rotatable cam shaft 220 is penetrated through a side wall of the frame body 205a. Cam followers 221a and 221b to which shield members 40a and 40b are attached are provided on the cam shaft 220. Rotation hold shafts 222a and 222b are provided on the cam followers 221a and 221b. One end portion of each of the rotation hold shafts 222a and 222b is engaged with a slot 225a formed in a hold portion 225 of the frame body 205a, thereby checking rotation of the cam follower 221a, 221b. The other end portion of each of the rotation hold shaft 222a, 222b is engaged with a helical groove 220a, 220b formed in the cam shaft 220. When the cam shaft 220 is rotated by a knob 220c, the cam followers 221a and 221b are axially moved.

Thus, if the cam shaft 220 is moved axially (in the direction of arrow X), the shield members 40a and 40b can be axially moved as one body. If the cam shaft 220 is rotated by the knob 220c, the shield members 40a and 40b can be moved toward, and away from, each other and accordingly the distance therebetween can be varied.

According to the above-described shield members and driving mechanism, the pupils of the right and left objective lenses of the stereomicroscope can be uniformly reduced in the front-and-rear direction. Since the right and left pupils are uniformly reduced, the right and left images are viewed in the same manner. A stereoscopic effect is created by a right-and-left parallax characterizing the stereomicroscope. In this case, by moving the shield members 40a and 40b, the ratio between direct light incident on the sample and diffraction light can be freely adjusted and the observation can be performed while successively varying contrast. Moreover, direct light can be cut off by approaching the shield members 40a and 40b to each other, and dark-field observation can be realized. As described above, since the amount of light incident on the pupil of each objective lens, the contrast can be freely controlled. In addition, since oblique light can be added, the contrast can be further enhanced and observation for various samples realized. The above-described driving mechanism is applicable to ordinary microscopes.

A description will now be given of another structure for controlling the aperture shape created within the pupil of the objective lens, by referring to a case where the invention is applied to an ordinary microscope.

FIG. 17A to FIG. 17C show a structure for partly controlling light intensity for an aperture created at the pupil of the objective lens. As is shown in FIG. 17A, an optical member for controlling light intensity, for example, an ND (Neutral density) filter 45, is movably disposed near one of the shield members, 40a. The filter 45 can move in the direction of the arrow, as shown in FIG. 17B, independently from the movement of the shield member 40a.

In FIG. 17B, regions where the pupil C is shielded by the shield members 40a and 40b are indicated by hatching, and a region where light passes through the filter 45 is indicated by crossing lines. With this structure, as represented by the pupil B, regions with different amounts of light can be created in the pupil of the objective lens (in the pupil B, a region indicated by symbol D is an opening region, and a region indicated by symbol E and crossing lines is a region at which the light amount is reduced by the filter 45 in the opening region). As a result, the amount of illumination light directly entering the sample can be reduced, and a fine area of the sample can easily be observed with high contrast. In addition, if the shield members 40a, 40b and filter 45 are moved, as desired, the angle of illumination light for illuminating the sample is varied and the ratio between the illumination light directly entering the objective lens and the diffraction light emanating from the sample can be adjusted more finely.

Although the filter 45 is so disposed as to overlap the shield member 40a, it is possible to provide another filter 45 at the region of the shield member 40b. This increases the degree of freedom of illumination.

Figure 18A:
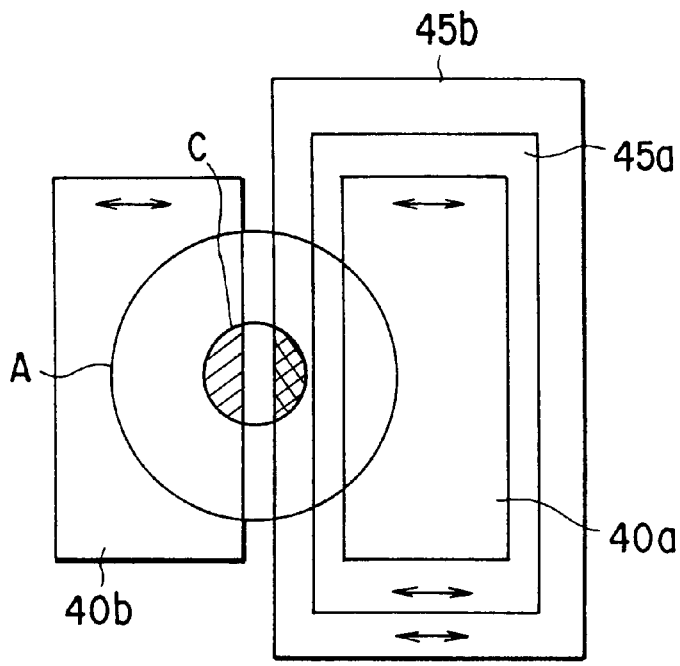
FIG. 18A and FIG. 18B show another example of the structure for partly controlling light intensity for an aperture created at the pupil of the objective lens.

FIG. 18 shows another example of the structure for partly controlling the light intensity for the aperture created at the pupil of the objective lens. In a structure shown in FIG. 18A, two ND filters 45a and 45b with different light attenuation ratios are disposed in a stacked manner near one shield member 40a. The two ND filters are movable independently from each other as well as from the shield members 40a and 40b.

With this structure, the light intensity for the opening with the same size can be controlled and the degree of freedom of illumination is increased. A phase-sample, etc. can be made visible, and the contrast can be controlled more finely. Needless to say, in this structure, too, filters 45a and 45b of the same structure may be disposed on the side of the shield member 40b.

Figure 18B:
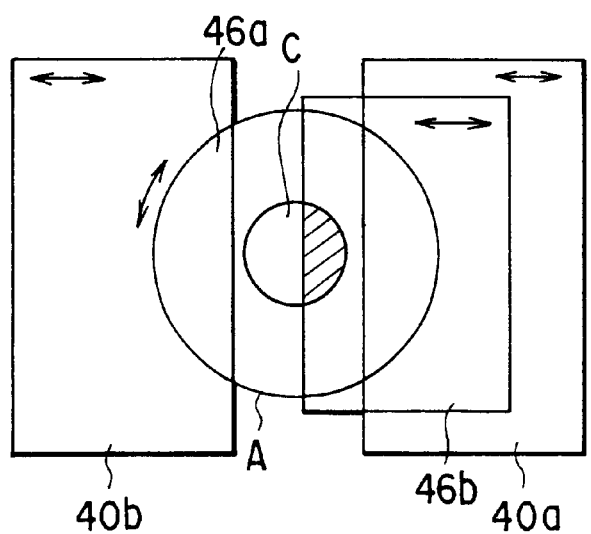

In the above-described structure, the ND filter is used as a member for controlling the light intensity. However, even if a polarizing element is used, the intensity at the aperture can be controlled as desired. For example, as shown in FIG. 18B, a rotatable polarizing plate 46a covering the entire area of the pupil A of the condenser may be disposed adjacent to the shield members 40a and 40b. In addition, a polarizing plate 46b is disposed near the shield member 40a so as to be movable in the direction of the arrow. Thus, if the polarizing plate 46b is overlapped over the polarizing plate 46a and the polarizing plate 46a is rotated, the light intensity at the overlapping region can be successively controlled, and the contrast of the phase sample can be successively varied.

Even if a liquid crystal panel is substituted for the above-described ND filter or polarizing plates, the same advantages can be obtained. Specifically, by controlling the voltage applied to the liquid crystal panel, the shape of the aperture created in the pupil of the objective lens can be varied and a region with different brightness can be freely created in the aperture. Besides, the ND filter, polarizing element and liquid crystal element may be freely combined.

Figure 19A:
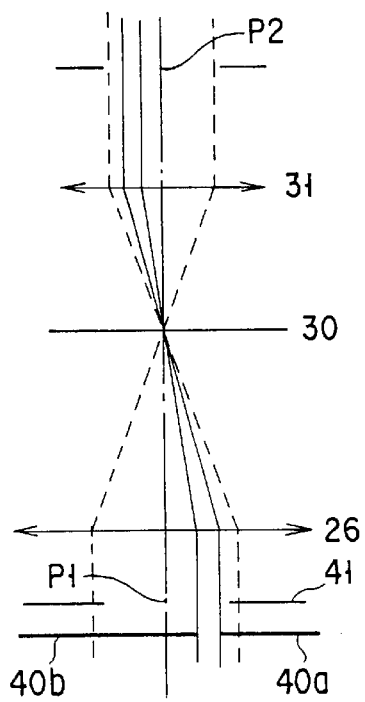
FIG. 19A and FIG. 19B show another example of the structure for controlling an aperture shape created at the pupil of the objective lens, FIG. 19A schematically showing an optical system, FIG. 19B showing a relationship between the shield member and the pupil.
Figure 19B:
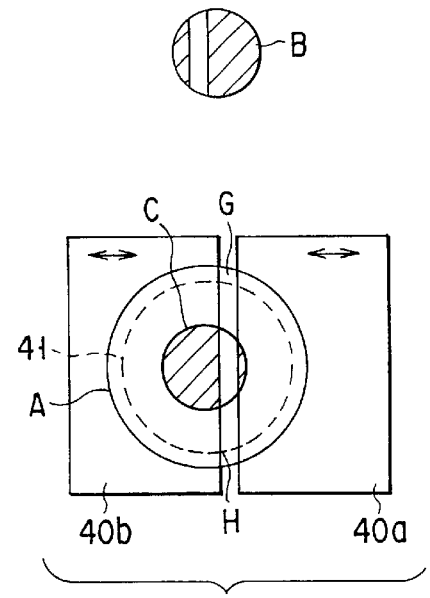

In the above structure, the condenser lens includes the aperture stop 41, as shown in FIG. 7. How to control the aperture created in the pupil of the objective lens in a case where the condenser lens has the aperture stop 41 will now be described with reference to FIGS. 19A and 19B.

The aperture stop 41 is so constructed as to reduce the pupil A with the maximum numerical aperture at which the condenser lens 26 can perform illumination. By controlling the aperture stop 41 along with the shield members 40a and 40b, the light at regions G and H can be cut off, as shown in the figure. Specifically, the aperture region of the pupil B of the objective lens can be limited in the longitudinal direction by narrowing the aperture stop 41. Moreover, dark-field illumination light which does not directly enter the objective lens can be adjusted. The provision of the aperture stop 41 is applicable to all of the above-described examples of the structure.

Figure 20A:
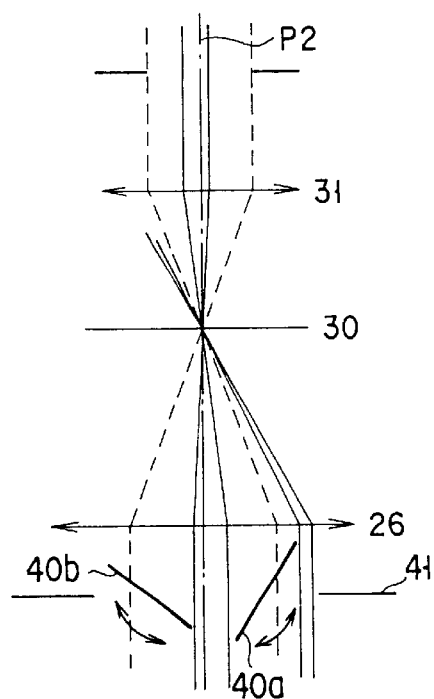
FIG. 20A and FIG. 20B show another example of the structure for controlling an aperture shape created at the pupil of the objective lens, FIG. 20A schematically showing an optical system, FIG. 20B showing a relationship between the shield member and the pupil.
Figure 20B:
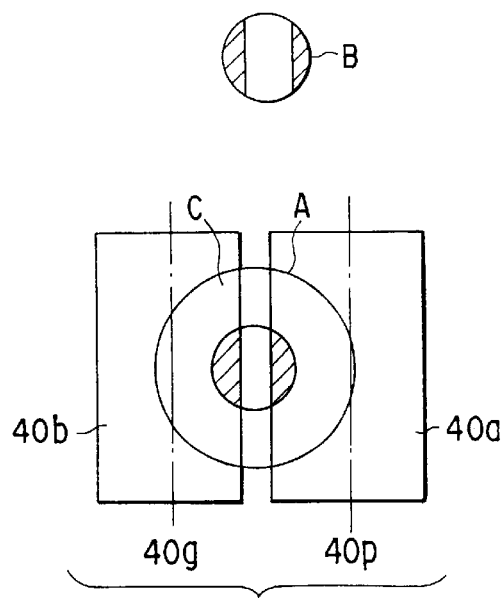
Figure 21:
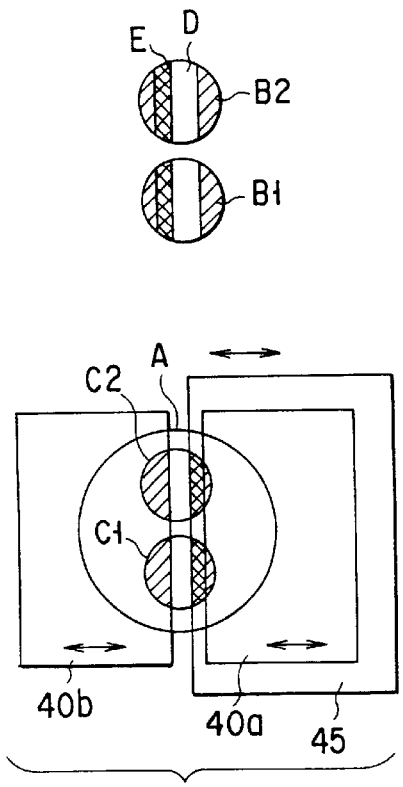
FIG. 21 shows a structure for partly controlling light intensity for an aperture created at the pupil of the objective lens in the stereomicroscope, as well as showing a relationship between the shield member and the pupil.
Figure 22:
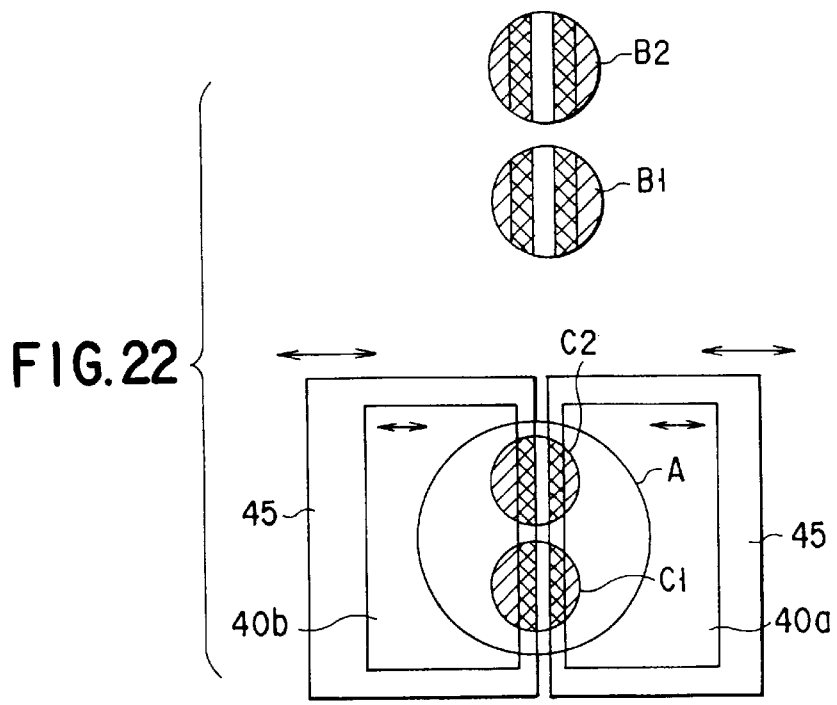
FIG. 22 shows another example of the structure of the shield member portion in FIG. 21.
Figure 23:
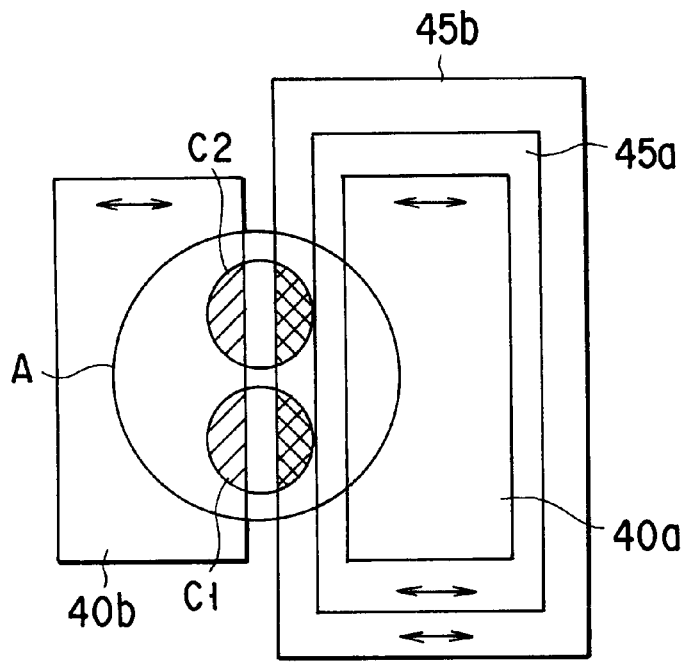
FIG. 23 shows another example of the structure for partly controlling light intensity for an aperture created at the pupil of the objective lens.
Figure 24:
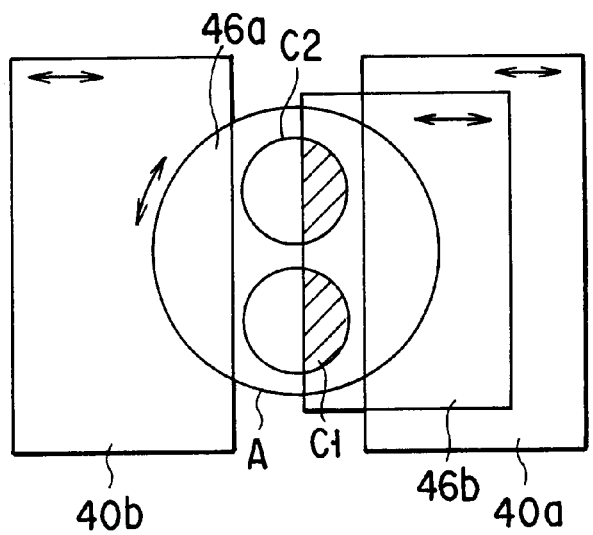
FIG. 24 shows another example of the structure for partly controlling light intensity for an aperture created at the pupil of the objective lens.

The direction of movement of the shield member 40a, 40b is not limited if the aperture shape of the pupil of the objective lens can effectively be controlled. For example, as shown in FIGS. 20A and 20B, the shield members may be so constructed as to be rotatable about axes 40p and 40q extending in the right-and-left direction. In this case, too, the aperture shape of the pupil of each objective lens can be effectively controlled.

In the description with reference to FIGS. 17 to 20, the ordinary microscopes are employed by way of example. The optical system shown in each figure is similarly applicable to stereoscopic microscopes. The positional relationship between the pupil and shield members in the stereomicroscope is the same as shown in FIG. 11. Specifically, it is as shown in FIGS. 21 to 26B.

FIGS. 27A to 29C show modifications of the shield members. These modifications are suited to ordinary microscopes.

Figure 27A:
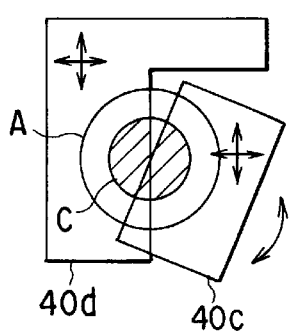
FIG. 27A to FIG. 27E show another example of the structure of the shield member, each showing an example of positional relationship in a case where two shield members have been shifted.
Figure 27B:
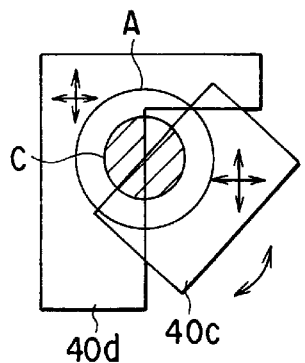
Figure 27C:
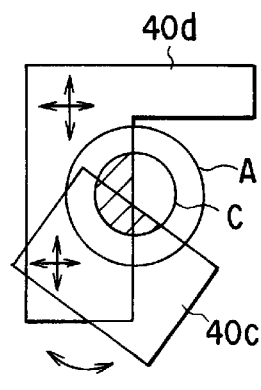
Figure 27D:
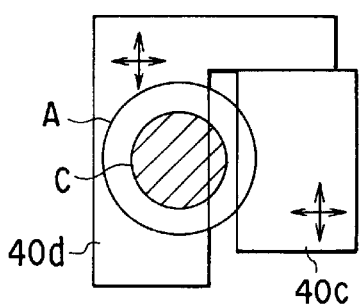
Figure 27E:
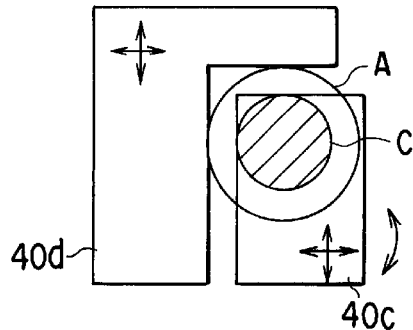

In a structure as shown in FIGS. 27A to 27E, one shield member 40d has an L-shape and the other shield member 40c has a rectangular shape. The shield members 40c and 40d with these shapes are so constructed as to be movable in the front-and-rear direction and the right-and-left direction. In addition, the shield member 40c is so constructed as to be rotatable in a plane perpendicular to the optical axis. Thereby, as shown in FIGS. 27A to 27D, the aperture shape of the pupil of the objective lens, and accordingly the illumination light directly entering the objective lens, can be successively adjusted (in the figures, a hatched region in the pupil C is a region shielded by the shield members 40c, 40d). Furthermore, as shown in FIG. 27E, dark-field illumination can be performed by shielding the pupil C alone. In this case, by partly shielding the pupil A, the light amount at the time of dark-field illumination can be successively adjusted and the degree of freedom for observation of the phase-sample can be improved.

Figure 28A:
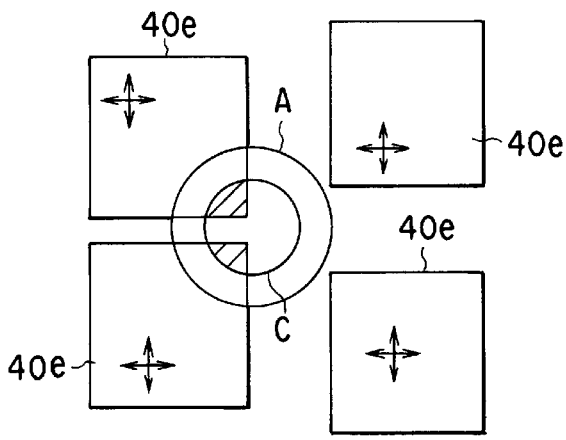
FIG. 28A and FIG. 28B show another example of the structure of the shield member, each showing an example of positional relationship in a case where two shield members have been shifted.
Figure 28B:
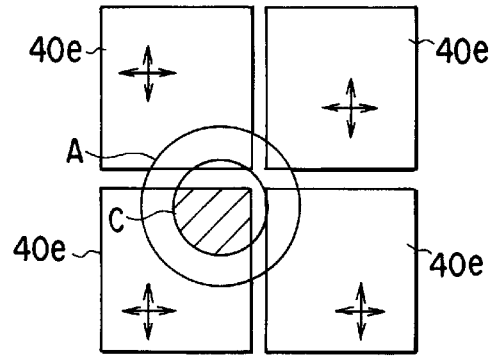

FIGS. 28A and 28B show an example of the structure wherein four square shield members 40e are disposed at (or near) positions conjugate with the pupil position of the objective lens. As is shown in FIGS. 28A and 28B, the shield members are moved in the front-and-rear direction and the right-and-left direction. Thereby, bright-field illumination can be switched to oblique illumination and to dark-field illumination, while the angle of incidence of illumination light is being varied. If each shield member 40e is made rotatable or an aperture stop is provided additionally, the degree of freedom for illumination increases and the degree of freedom for observation of the phase-sample improves.

Figure 29A:
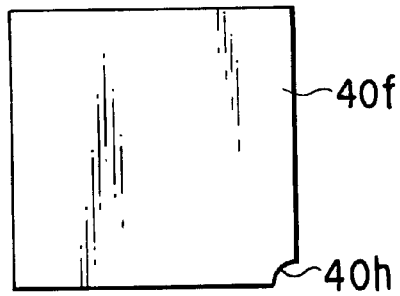
FIG. 29A to FIG. 29C show another example of the structure of the shield member, FIG. 29A showing a structure with one shield member, FIG. 29B and FIG. 29C showing examples of positional relationship in a case where two shield members have been shifted.
Figure 29B:
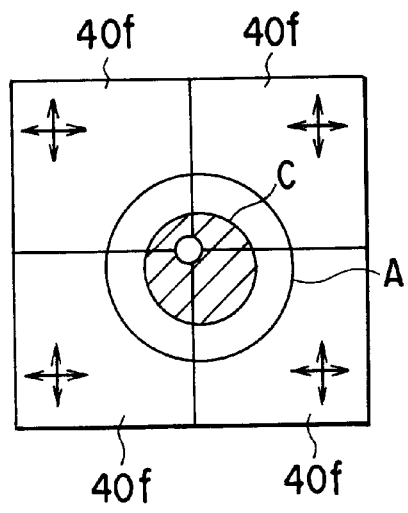
Figure 29C:
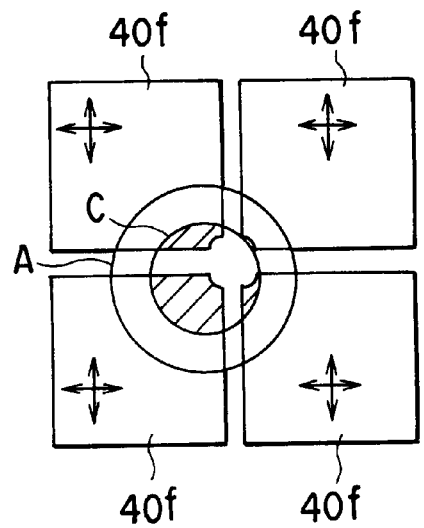

FIGS. 29A to 29C show an example of the structure wherein rectangular shield members 40f each having a quadrantal notch 40h, as shown in FIG. 29A, are disposed at (or near) a position conjugate with the pupil position of the objective lens. If the shield members are put in contact, as shown in FIG. 29B, a shield member with a central circular aperture is formed. Using this, oblique illumination can be performed with a circular aperture. If each shield member is shifted in directions of arrows, various aperture shapes can be realized, for example, as shown in FIG. 29C.

As has been described above, even where the number of shield members is two or more or the shape of each shield member is not rectangular, the aperture shape of the pupil of the objective lens can be freely controlled. It is possible to visualize a transparent phase-sample and to successively control the contrast.

In the above structure, it is preferable to shift the shield members so as to meet the following condition for the ratio (D2/D1) of D2 to D1:

D2/D1<0.5  (Condition 1)

where D1 is the area of the pupil of the objective lens, and D2 is the area of the aperture created in the pupil of the objective lens by the shield members. By meeting Condition 1, the transparent phase-sample can be made visible with good contrast.

Specifically, the ratio (D2/D1) of D2 to D1 is a ratio between direct light directly entering an objective lens through a sample and diffraction light due to the sample, and it is a numerical value representing the degree of oblique illumination. If the above condition is satisfied, diffraction light from the sample can be taken in and oblique illumination with a reduced ratio of direct light or dark-field illumination can be realized. Thus, the transparent sample can be made visible with high contrast.

In the above structure, in order to visualize the transparent phase-sample with high contrast, an illumination optical system having a condenser lens which can take a large illumination angle, as in oblique illumination or dark-field illumination, is required. Moreover, it is important to visualize a phase-sample, as the illumination range of the condenser lens increases, that is, as the magnification decreases. If the range for observation increases, the efficiency for observation improves.

In general, a certain relationship is present between the magnification of an objective lens and the numerical aperture. The magnification and numeral aperture of the objective lens have the following values in approximation (TABLE 1):

| Magnification of Objective Lens | Numerical Aperture |
|---|---|
| 0.5 | 0.02 |
| 1–1.25 | 0.04 |
| 2 | 0.08 |
| 4 | 0.16 |
| 10 | 0.4 |
| 20 | 0.7 (Dry System) |
|  | 0.8 (Oil-Immersion System) |
| 40 | 0.95 (Dry System) |
|  | 1.3 (Oil-Immersion System) |
| 100 | 0.95 (Dry System) |
|  | 1.4 (Oil-Immersion System) |

Assuming that the maximum numerical aperture at which the condenser lens can perform illumination is NA1 and the numerical aperture of the objective lens at which the maximum illumination range of the condenser lens can be observed is NA2, the transmission-illumination optical system should preferably have a condenser lens which satisfies:

NA2/NA1<0.6  (Condition 2)

As regards the objective lens with which the maximum illumination range can be observed, if Condition 2 is satisfied, sufficient illumination light, which has a large illumination angle and does not directly enter the objective lens, is obtained. Since illumination light components for oblique illumination including dark-field illumination can be sufficiently maintained, the degree of freedom for illumination is increased in a range from oblique illumination to dark-field illumination by shifting two or more shield members. As a result, from observation with a low-magnification objective lens, the contrast of the transparent phase-sample can be successively varied. Since the numerical aperture increases as the magnification of the objective lens increases, the region for oblique illumination including dark-field illumination is decreased in accordance with an increase in magnification of the objective lens. It is therefore necessary to meet Condition 2, not only in low-magnification observation but also in observation with other magnification.

The shield members are situated at or near the front-side focal position of the condenser lens, as shown in FIG. 7. However, depending on the design of the optical system of the microscope, they may be situated at various positions. An example of such an optical system will now be described with reference to FIG. 30.

Figure 30:
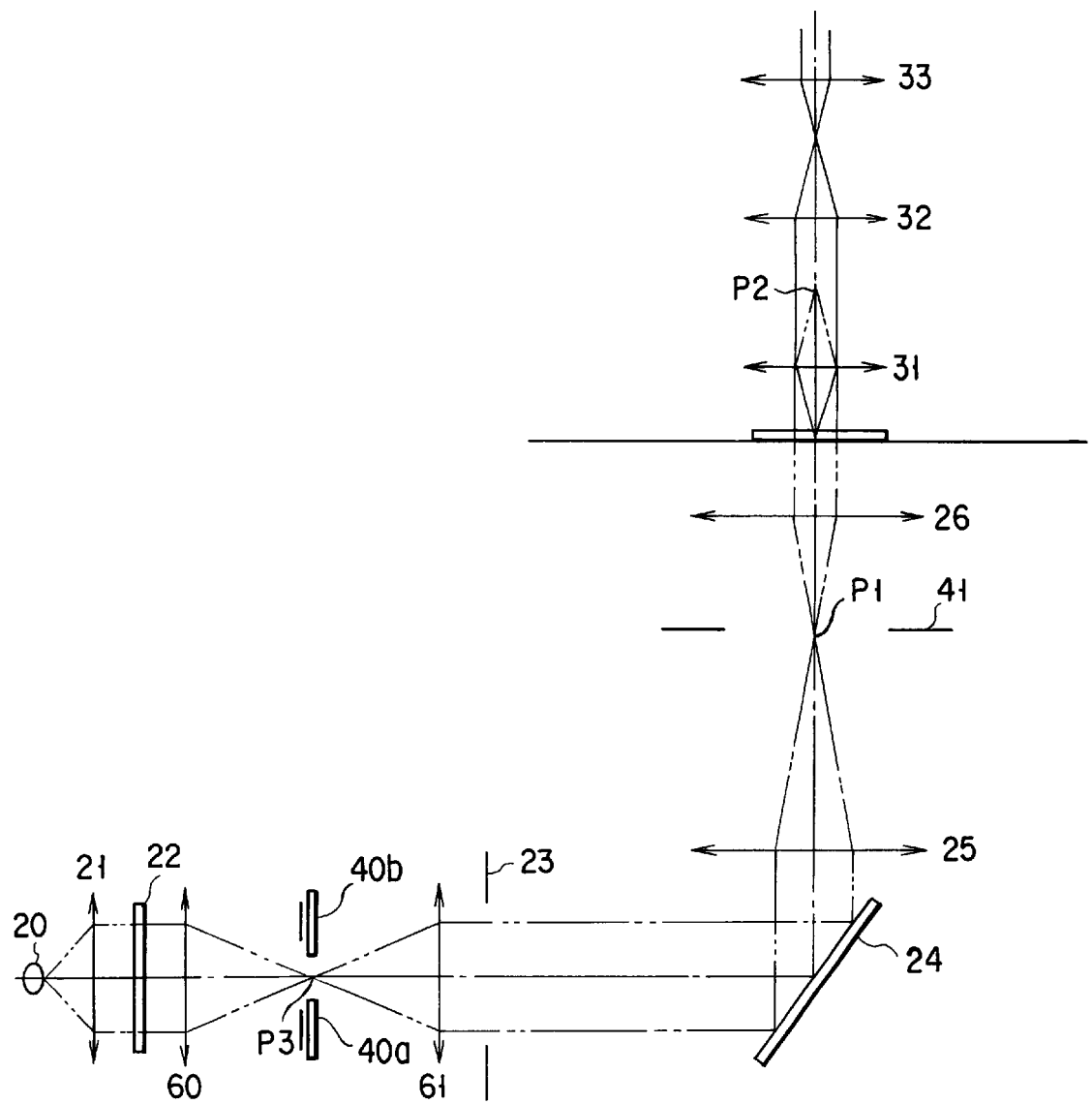
FIG. 30 shows another example of the structure of the transmission-illumination optical system.

FIG. 30 shows a structure relating to a modified design of the transmission-illumination optical system in the optical system shown in FIG. 7 (the same elements as in FIG. 7 are denoted by like reference numerals). In this transmission-illumination optical system, relay lenses 60 and 61 are provided between the diffusion plate 22 and deflection mirror 24 shown in FIG. 7. According to this structure, light from the light source 20 is converted to parallel light by means of the collector lens 21 and then passed through the relay lens 60, thereby forming a primary light-source image (the focal position indicated by symbol P3). The primary light-source image is projected at the front-side focal position (a secondary light-source image) via the relay lens 61, deflection mirror 24 and projection lens 25. The stop 23 is a field stop, and the stop 41 functions as an aperture stop.

According to this optical system, the shield members 40a and 40b with the above-described structure (or shield members with some other structure described above) can be disposed at or near the position P3 of the primary light-source image which is conjugate with the pupil of the objective lens 31. With this structure, too, each shield member is moved so as to meet Condition 1 and thus the effect of oblique illumination or dark-field illumination is obtained. In addition, in the case of illuminating a region with a low magnification or a very low magnification, the condenser lens is removed from the illumination optical path or the condenser lens for use in illumination with a magnification of X1 or less is constituted as an afocal system. In this case, the position conjugate with the pupil position of the objective lens 31 corresponds to the field stop 23 at the front-side focal position of the projection lens 25. Accordingly, the same effect is obtained by movably disposing the shield members with the above structure at or near the position of the field stop 23.

In the above-described transmission-illumination optical system, the deflection mirror 24 may be constructed to be rotatable. In the case of the stereomicroscope shown in FIG. 6, the deflection mirror 24 is rotated by operating the mirror-inclination adjustment lever 204. Since the deflection mirror 24 is thus rotatable, the angle of illumination light on the sample can be desirably adjusted in the oblique illumination mode or dark-field illumination mode.

In the above structure, the condenser lens used in the transmission-illumination optical system is constructed to be switchable according to the magnification of the objective lens. Specifically, at least one lens group provided between the aperture stop of the condenser lens and the sample is held/detached or replaced with another lens group in accordance with the objective lens with a low magnification or the objective lens with a high magnification. In the condenser lens with this structure, it is preferable to dispose the above-described shield members at or near the pupil position of the condenser lens in the low-magnification mode.

The reason why the shield members are disposed at or near the pupil position of the condenser lens in the low-magnification mode will be stated below. With the illumination method according to the present invention, exact information is not necessarily be obtained for the sample observed in the high-magnification mode with a large numerical aperture. In the low-magnification mode, a scattering phenomenon due to illumination, rather than a diffraction phenomenon, will occur. In addition, in the observation in the low-magnification mode, it is necessary to make visualization with the contract varied successively, rather than to place much importance on the resolution.

If the shield members for controlling the aperture created in the pupil of the objective lens is disposed at the pupil position of the condenser lens in the low-magnification mode, the illumination can be changed successively from the bright-field illumination to oblique illumination and then to dark-field illumination, as described above, even in the low-magnification mode for visualizing the phase-sample. Thus, the contrast of the phase-sample can be successively varied. In addition, in the high magnification mode, by using in combination a universal condenser which is a condenser lens capable of phase-contrast observation or differential-interference observation, the respective illumination modes can be switched. Specifically, a structure can be adopted such that in the observation with a low magnification the structure and distribution of the entire phase-sample can be made visible with high contrast using the above-mentioned illumination method and in the observation with a high magnification the detailed structure can be observed using the conventional observation method such as the phase-contrast method and differential-interference method.

In a case where the condenser lens wherein, as described above, at least one lens group provided between the aperture stop of the condenser lens and the sample is held/detached or replaced with another lens group in accordance with the objective lens with a low magnification or the objective lens with a high magnification is used in the transmission-illumination optical system, it is preferable to meet the following condition:

$$F1/F2 < 0.45 \quad \text{(Condition 3)}$$

where F1 is the focal distance of the condenser lens in the high-magnification mode, and F2 is the focal distance of the condenser lens in the low-magnification mode.

If the condenser lens is designed to meet Condition 3, good illumination can be achieved by switching the two condenser lenses in a range from a high magnification to a low magnification and to a very low magnification. In particular, in the range from a low magnification to a very low magnification, the illumination can be freely varied by means of the above-mentioned shield members for controlling the aperture shape created in the pupil of the objective lens. Thus, the transparent phase sample can be visualized with high contrast.

Examples of the structure of the condenser lens used in the microscope transmission-illumination apparatus of the present invention will now be specifically described.

Example 1 of Structure

Figure 31:
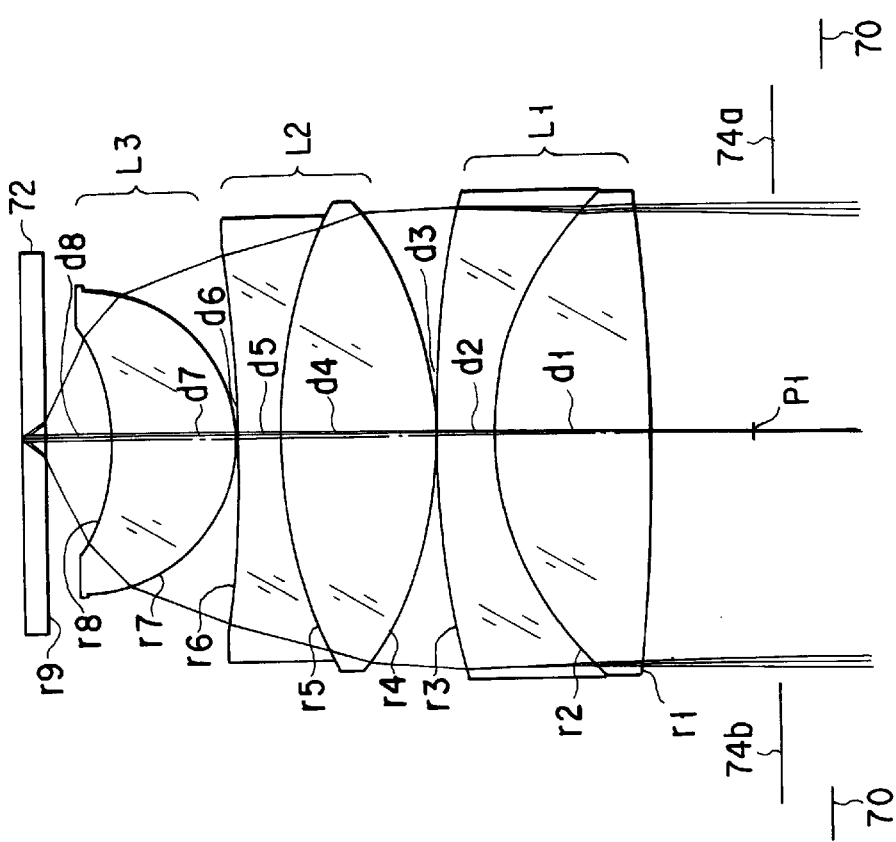
FIG. 31 shows the structure of a high-magnification condenser lens for use in the transmission-illumination optical system according to the present invention.

FIG. 31 shows a condenser lens used for a high magnification. A lens system comprises lens groups L1, L2 and L3. The condenser lens includes an aperture stop 70 and a special observation turret disc (not shown), such as a phase-contrast ring slit, a differential-interference prism or a dark-field ring slit, provided at a pupil position P1 of the condenser lens. A sample is placed on a slide glass 72 and disposed in a stage plane. The shield members 74a and 74b having the above-described structure are movably disposed near the pupil position P1.

The structure of the condenser lens will be shown below.

Symbols r1, r2, . . . denote the radii of curvature of respective lenses arranged in order from the light source side.

Symbols d1, d2, . . . denote thickness of air gap or glass member.

Symbols nd1, nd2, . . . denote d-line refractive indices of respective lenses.

Symbols v1, v2, . . . denote Abbe numbers of respective lenses.

The aperture stop (70) is situated at a position of 10.4 from a first plane on the light-source side.

The pupil (P1) is situated at a position of 5.40 from the first plane on the light-source side.

| | | | |
|---|---|---|---|
| r1 = 111.02 | d1 = 8.77 | nd1 = 1.48749 | v1 = 70.2 |
| r2 = −17.26 | d2 = 3.16 | nd2 = 1.58921 | v2 = 41.1 |
| r3 = −59.01 | d3 = 0.11 | | |
| r4 = 21.59 | d4 = 8.69 | nd3 = 1.741 | v3 = 52.7 |
| r5 = −27.78 | d5 = 2.3 | nd4 = 1.84666 | v4 = 23.8 |
| r6 = 79.83 | d6 = 0.23 | | |
| r7 = 8.28 | d7 = 6.9 | nd5 = 1.741 | v5 = 52.7 |
| r8 = 12.58 | d8 = 3.64 | | |
| r9 = ∞ (stage plane) | | | |

The focal distance of the condenser lens is 13.28 mm.

The maximum illuminable numerical aperture NA1 is 0.9.

The magnification of the objective lens corresponding to the maximum illuminable range is ×10.

The numerical aperture NA2 of the ×10-magnification lens is 0.4 from Table 1.

Since NA2/NA1=0.444, Condition 2 is satisfied.

According to the above condenser lens, the pupil diameter of the condenser lens is sufficiently greater than that of the low-magnification objective lens, and oblique-illumination components including dark-field illumination for illuminating the sample is obtained. Thus, the transparent phase-sample, etc. can be visualized and the contrast varied successively by movably disposing, near the aperture stop position, the shield members for controlling the shape of the aperture created in the pupil of the objective lens. In addition to the illumination apparatus of the present invention, according to the condenser lens, the phase-contrast observation, differential-interference observation and dark-field observation can be performed, and the illumination optical system permitting various observation methods is realized. The advantages can be obtained with the structure wherein the shield members 74a and 74b are disposed in the turret disc and moved.

Example 2 of Structure

Figure 32:
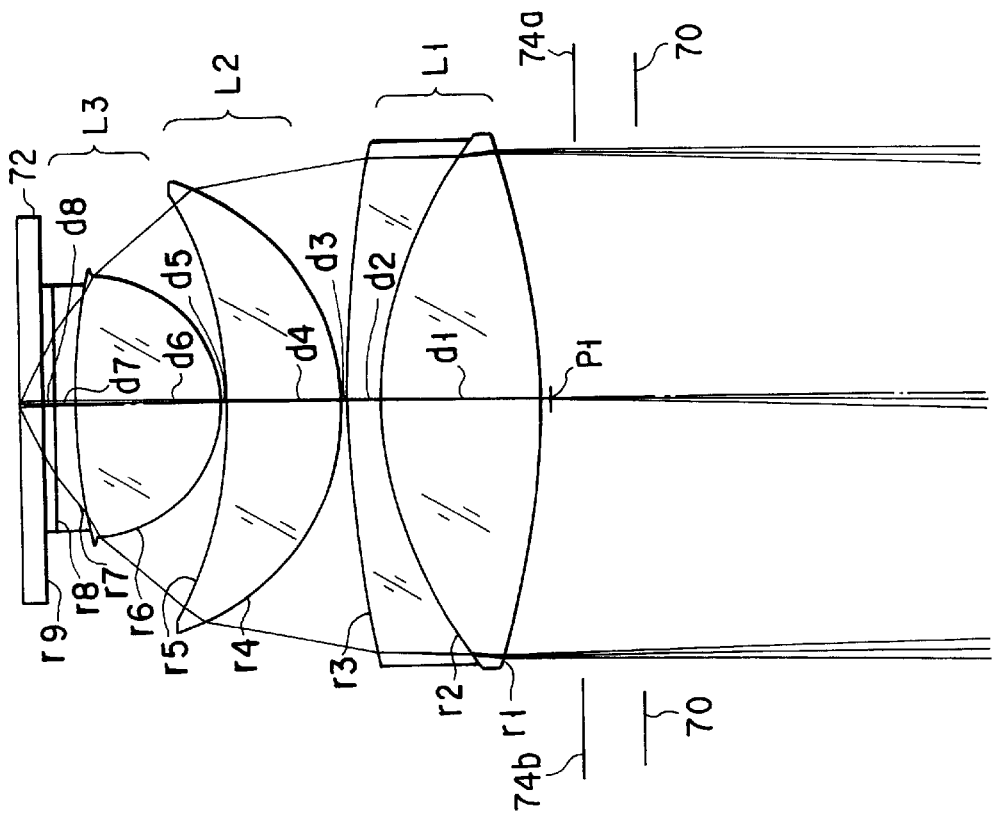
FIG. 32 a second structure of the high-magnification condenser lens.

FIG. 32 shows a condenser lens used for a high magnification. A lens system comprises lens groups L1, L2 and L3. The condenser lens includes an aperture stop 70 and a special observation turret disc (not shown), such as a phase-contrast ring slit, a differential-interference prism or a dark-field ring slit, provided at a pupil position P1 of the condenser lens. A sample is placed on a slide glass 72 and disposed in a stage plane. In this case, oil for oil-immersion is filled between the lens L3 and the stage. The shield members 74a and 74b having the above-described structure are movably disposed near the pupil position P1.

The structure of the condenser lens will be shown below.

Symbols r1, r2, . . . denote the radii of curvature of respective lenses arranged in order from the light source side.

Symbols d1, d2, . . . denote thickness of air gap or glass member.

Symbols nd1, nd2, . . . denote d-line refractive indices of respective lenses.

Symbols v1, v2, . . . denote Abbe numbers of respective lenses.

The aperture stop (70) is situated at a position of 5.25 from a first plane on the light-source side.

The pupil (P1) is situated at a position of 0.25 from the first plane on the light-source side.

| | | | |
|---|---|---|---|
| r1 = 43.66 | d1 = 9.0 | nd1 = 1.56873 | v1 = 63.2 |
| r2 = −21.71 | d2 = 1.9 | nd2 = 1.78472 | v2 = 25.7 |
| r3 = −61.47 | d3 = 0.3 | | |
| r4 = 12.79 | d4 = 6.4 | nd3 = 1.58913 | v3 = 61.0 |
| r5 = 24.9 | d5 = 0.3 | | |
| r6 = 7.07 | d6 = 8.0 | nd4 = 1.62041 | v4 = 60.3 |
| r7 = −34.01 | d7 = 1.1 | nd5 = 1.72825 | v5 = 28.5 |
| r8 = ∞ | d8 = 0.6 | (nd6 = 1.515 | v6 = 43.1) |
| r9 = ∞ (stage plane) | | | |

The focal distance of the condenser lens is 10.00 mm.

The maximum illuminable numerical aperture NA1 is 1.37.

The magnification of the objective lens corresponding to the maximum illuminable range is ×20.

The numerical aperture NA2 of the ×20-magnification lens is 0.7 from Table 1.

Since NA2/NA1=0.511, Condition 2 is satisfied.

According to the above condenser lens, the pupil diameter of the condenser lens is sufficiently greater than that of the low-magnification objective lens, and oblique-illumination components including dark-field illumination for illuminating the sample is obtained. Thus, the transparent phase-sample, etc. can be visualized and the contrast varied successively by movably disposing, near the aperture stop position, the shield members for controlling the shape of the aperture created in the pupil of the objective lens. In addition to the illumination apparatus of the present invention, according to the condenser lens, the phase-contrast observation, differential-interference observation and dark-field observation can be performed, and the illumination optical system permitting various observation methods is realized. The advantages can be obtained with the structure wherein the shield members 74a and 74b are disposed in the turret disc and moved.

Example 3 of Structure

Figure 33:
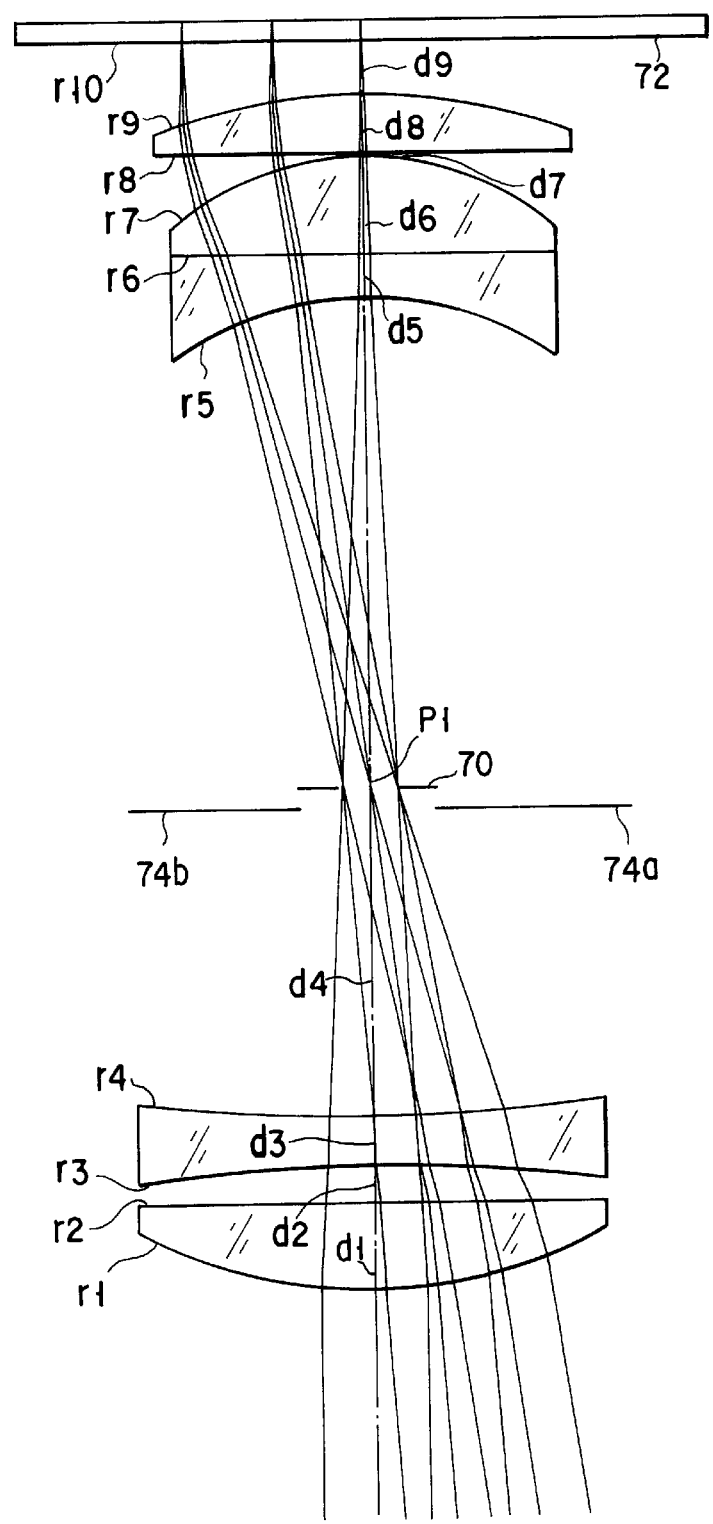
FIG. 33 shows the structure of a low-magnification condenser lens for use in the transmission-illumination optical system according to the present invention.

FIG. 33 shows a condenser lens used for a low magnification. Shield members 74a and 74b are movably provided for controlling the shape of the aperture created in the objective lens. This condenser lens has, in a lens system, an aperture stop 70 and five lenses including junction. A sample is placed on a slide glass 72 and disposed in a stage plane. The shield members 74a and 74b are disposed near the aperture stop 70 which is close to the pupil position.

The structure of the condenser lens will be shown below.

Symbols r1, r2, . . . denote the radii of curvature of respective lenses arranged in order from the light source side.

Symbols d1, d2, . . . denote thickness of air gap or glass member.

Symbols nd1, nd2, . . . denote d-line refractive indices of respective lenses.

Symbols v1, v2, . . . denote Abbe numbers of respective lenses.

The aperture stop (70) and pupil (P1) are situated at a position of 20.0 from a fourth plane on the sample side.

| | | | |
|---|---|---|---|
| r1 = 27.892 | d1 = 5.3 | nd1 = 1.77250 | v1 = 49.6 |
| r2 = ∞ | d2 = 2.34 | | |

-continued

| | | | |
|---|---|---|---|
| r3 = −92.482 | d3 = 2.80 | nd2 = 1.74077 | v2 = 27.79 |
| r4 = 92.482 | d4 = 48.91 | | |
| r5 = −19.919 | d5 = 2.45 | nd3 = 1.84666 | v3 = 23.78 |
| r6 = ∞ | d6 = 5.55 | nd4 = 1.59551 | v4 = 39.21 |
| r7 = −18.184 | d7 = 0.2 | | |
| r8 = ∞ | d8 = 3.59 | nd5 = 1.7725 | v5 = 49.6 |
| r9 = −34.61 | d9 = 3.8 | | |
| r9 = ∞ (stage plane) | | | |

The focal distance of the condenser lens is 74.94 mm.

The maximum illuminable numerical aperture NA1 is 0.16.

The magnification of the objective lens corresponding to the maximum illuminable range is ×1.25.

The numerical aperture NA2 of the ×20-magnification lens is 0.04 from Table 1.

Since NA2/NA1=0.25, Condition 2 is satisfied.

According to the above condenser lens, the pupil diameter of the condenser lens is sufficiently greater than that of the very-low-magnification objective lens, and oblique-illumination components including dark-field illumination for illuminating the sample is obtained. Thus, the transparent phase-sample, etc. can be visualized and the contrast varied successively by movably disposing, near the aperture stop position, the shield members for controlling the shape of the aperture created in the pupil of the objective lens. In addition, as described in connection with the prior art, in the region with this magnification there is no illumination for visualizing the phase-sample and varying the contrast. According to this example of structure, the illumination which is unavailable in the prior art can be realized.

Example 4 of Structure

Figures 34A, 34B:
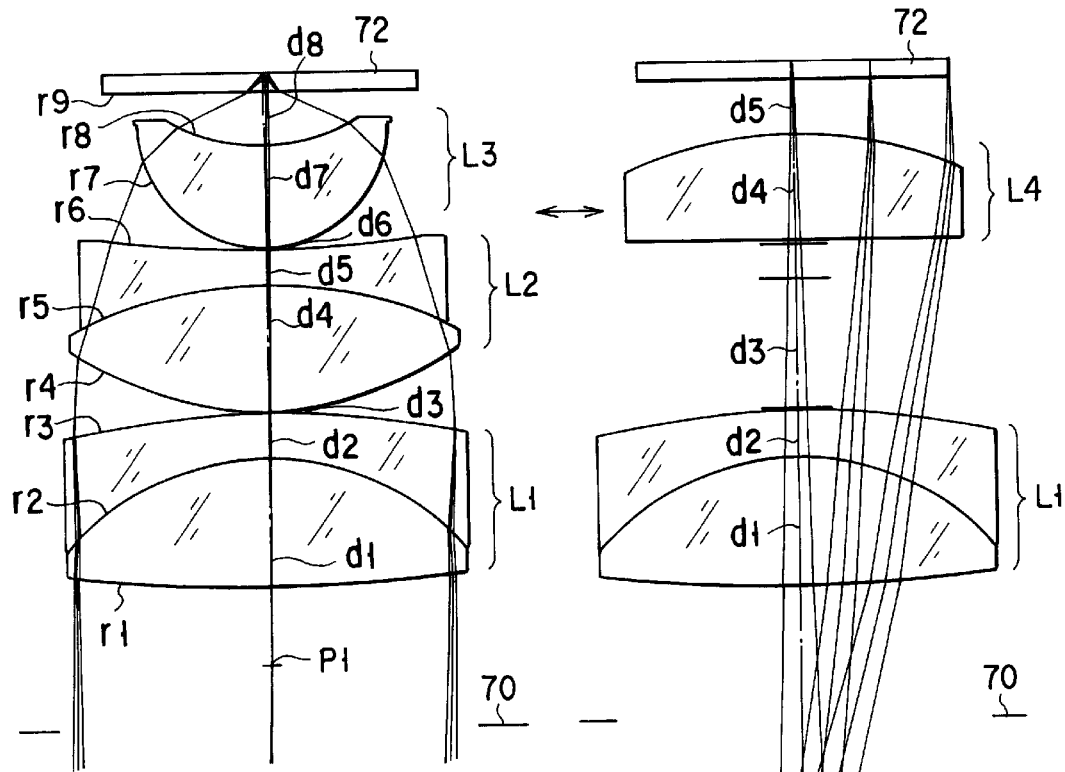
FIG. 34A and FIG. 34B show structures of switchable condenser lenses for use in a microscope transmission-illumination apparatus, FIG. 34A showing a structure of a high-magnification condenser lens, FIG. 34B showing a structure of a low-magnification condenser lens.

FIGS. 34A and 34B show the structure of a condenser lens in which at least one lens group provided between an aperture stop and a sample can be switched according to a high magnification and a low magnification. FIG. 34A shows a structure for a high-magnification mode and FIG. 34B shows a structure for a low-magnification mode.

The condenser lens used in the high-magnification mode has the same structure as shown in FIG. 31. In the low-magnification mode, lens groups L2 and L3 are shifted out of the illumination optical path and a lens group L4, in turn, is shifted into the illumination optical path. Shield members 74a and 74b for controlling the aperture created in pupil of the objective lens are movably disposed near the pupil position P1 in the low-magnification mode.

The range of illumination in the high-magnification mode corresponds to a range of ×10 to ×100, and the range of illumination in the low-magnification mode corresponds to a range of ×1.25 to ×4.

The structure of the condenser lens will be shown below.

Symbols r1, r2, . . . denote the radii of curvature of respective lenses arranged in order from the light source side.

Symbols d1, d2, . . . denote thickness of air gap or glass member.

Symbols nd1, nd2, . . . denote d-line refractive indices of respective lenses.

Symbols v1, v2, . . . denote Abbe numbers of respective lenses.

(In the high-magnification mode: ×10 to ×100)

The aperture stop (70) is situated at a position of 10.4 from a first plane on the light-source side.

The pupil (P1) is situated at a position of 5.40 from the first plane on the light-source side.

| | | | |
|---|---|---|---|
| r1 = 111.02 | d1 = 8.77 | nd1 = 1.48749 | v1 = 70.2 |
| r2 = −17.26 | d2 = 3.16 | nd2 = 1.58921 | v2 = 41.1 |
| r3 = −59.01 | d3 = 0.11 | | |
| r4 = 21.59 | d4 = 8.69 | nd3 = 1.741 | v3 = 52.7 |
| r5 = −27.78 | d5 = 2.3 | nd4 = 1.84666 | v4 = 23.8 |
| r6 = 79.83 | d6 = 0.23 | | |
| r7 = 8.28 | d7 = 6.9 | nd5 = 1.741 | v5 = 52.7 |
| r8 = 12.58 | d8 = 3.64 | | |
| r9 = ∞ (stage plane) | | | |

(In the low-magnification mode: ×1.25 to ×4)

The aperture stop (70) is situated at a position of 10.4 from the first plane on the light-source side.

The pupil (P1) is situated at a position of 24.3 from the first plane on the light-source side.

| | | | |
|---|---|---|---|
| r1 = 111.02 | d1 = 8.77 | nd1 = 1.48749 | v1 = 70.2 |
| r2 = −17.26 | d2 = 3.16 | nd2 = 1.58921 | v2 = 41.1 |
| r3 = −59.01 | d3 = 11.33 | | |
| r4 = ∞ | d4 = 6.9 | nd3 = 1.51633 | v3 = 64.1 |
| r5 = −30.0 | d5 = 3.64 | | |

The focal distance F1 of the condenser lens in the high-magnification mode is 13.29.

The focal distance F2 of the condenser lens in the low-magnification mode is 43.63.

F1/F2=0.30

According to the above condenser lens, the shield members are disposed near the pupil position in the low-magnification mode. Thus, in the range of ×1.25 to ×4, the phase-sample can be visualized and the contrast varied successively. Accordingly, in the region of a very low magnification to a low magnification, the phase-sample can be visualized and observed using the above-described low-magnification condenser lens. In addition, in the high-magnification mode, the phase-contrast observation, differential-interference observation and dark-field observation can be performed.

Example 5 of Structure

FIGS. 35A and 35B show a structure of a condenser lens which is switched in use in accordance with a high magnification and a low magnification. FIG. 35A shows a structure for use in the high-magnification mode, and FIG. 35B shows a structure for use in the low-magnification mode. In this case, the condenser lens used in the high-magnification mode has the same structure as shown in FIG. 31, and the condenser lens used in the low-magnification mode has the same structure as shown in FIG. 33.

The structure of the condenser lens will be shown below.

Symbols r1, r2, . . . denote the radii of curvature of respective lenses arranged in order from the light source side.

Symbols d1, d2, . . . denote thickness of air gap or glass member.

Symbols nd1, nd2, . . . denote d-line refractive indices of respective lenses.

Symbols v1, v2, . . . denote Abbe numbers of respective lenses.

(In the high-magnification mode: ×10 to ×100)

The aperture stop (70) is situated at a position of 10.4 from a first plane on the light-source side.

The pupil (P1) is situated at a position of 5.40 from the first plane on the light-source side.

| | | | |
|---|---|---|---|
| r1 = 111.02 | d1 = 8.77 | nd1 = 1.48749 | v1 = 70.2 |
| r2 = −17.26 | d2 = 3.16 | nd2 = 1.58921 | v2 = 41.1 |
| r3 = −59.01 | d3 = 0.11 | | |
| r4 = 21.59 | d4 = 8.69 | nd3 = 1.741 | v3 = 52.7 |
| r5 = −27.78 | d5 = 2.3 | nd4 = 1.84666 | v4 = 23.8 |
| r6 = 79.83 | d6 = 0.23 | | |
| r7 = 8.28 | d7 = 6.9 | nd5 = 1.741 | v5 = 52.7 |
| r8 = 12.58 | d8 = 3.64 | | |
| r9 = ∞ (stage plane) | | | |

(In the low-magnification mode: ×1.25 to ×4)

The aperture stop (70) and pupil (P1) are situated at a position of 20.0 from a fourth plane on the sample side.

| | | | |
|---|---|---|---|
| r1 = 27.892 | d1 = 5.3 | nd1 = 1.77250 | v1 = 49.6 |
| r2 = ∞ | d2 = 2.34 | | |
| r3 = −92.482 | d3 = 2.80 | nd2 = 1.74077 | v2 = 27.79 |
| r4 = 92.482 | d4 = 48.91 | | |
| r5 = −19.919 | d5 = 2.45 | nd3 = 1.84666 | v3 = 23.78 |
| r6 = ∞ | d6 = 5.55 | nd4 = 1.59551 | v4 = 39.21 |
| r7 = −18.184 | d7 = 0.2 | | |
| r8 = ∞ | d8 = 3.59 | nd5 = 1.7725 | v5 = 49.6 |
| r9 = −34.61 | d9 = 3.8 | | |
| r10 = ∞ (stage plane) | | | |

The focal distance of the condenser lens is 74.94 mm.

The focal distance F1 of the condenser lens in the high-magnification mode is 13.29.

The focal distance F2 of the condenser lens in the low-magnification mode is 74.94.

F1/F2=0.18

According to the above condenser lens, the shield members are disposed near the pupil position in the low-magnification mode. Thus, in the range of ×1.25 to ×4, the phase-sample can be visualized and the contrast varied successively. As regards the condenser lens in the high-magnification mode, since the optical element for phase-contrast observation and differential-interference observation is disposed at the pupil position of the condenser lens, such observation can be performed.

Accordingly, in the region of a very low magnification to a low magnification, the phase-sample can be visualized and observed using the above-described low-magnification condenser lens. In addition, in the high-magnification mode, the phase-contrast observation, differential-interference observation and dark-field observation can be performed, and the illumination optical system permitting various observation methods is realized. Since the positions of the shield members 74a, 74b situated in the low-magnification mode are close to the pupil position of the condenser lens in the high-magnification mode, the aperture created in the pupil of the objective lens can be controlled using the shield members 74a and 74b even with the condenser lens in the high-magnification mode.

The above-described transmission-illumination optical system may be combined in use with a reflected-illumination fluorescent microscope (not shown). Since there is no need to dispose the phase-film at the pupil position of the objective lens, unlike the phase-contrast observation objective lens, no loss occurs in the objective lens and fluorescence can be observed with high brightness. A fluorescence-colored transparent phase-sample can be visualized with high contrast by using the above-described transmission-illumination system, whereby a cell, etc. which is fluorescence-colored by reflected-fluorescence-illumination, can be observed.

Figure 36:
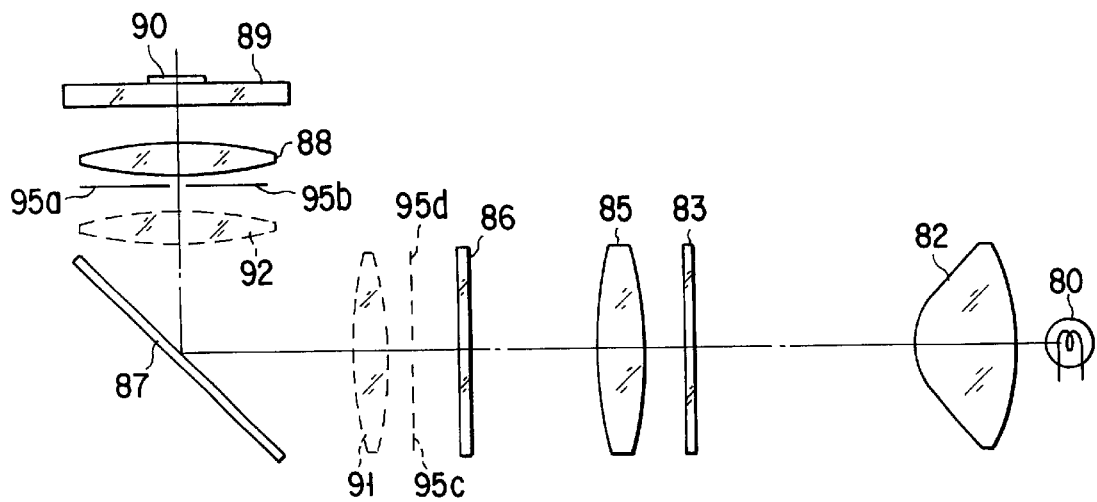
FIG. 36 shows a second embodiment of the present invention.

A second embodiment of the present invention will now be described with reference to FIG. 36. FIG. 36 shows a schematic structure of a transmission-illumination optical system in a stereomicroscope.

The transmission-illumination optical system comprises a parallel-beam member 82, such as a collector lens, for converting light from a light source 80 such as a halogen lamp; a first diffusion plate 83, such as a frosted glass, for diffusing a light beam from the parallel-beam member 82; a first collection member 85, such as a convex lens, for collecting diffused light from the first diffusion plate 83; a second diffusion plate 86, such as a frosted glass, for diffusing light from the first collection member 85; a deflection mirror 87 for deflecting upward the light from the second diffusion plate 86; and a second collection member 88, such as a convex lens, for collecting light from the deflection mirror 87 and radiating the light onto a sample 90 on a sample-mounting glass 89.

A first auxiliary convex lens 91 is disposed between the second diffusion plate 86 and deflection mirror 87 so as to be shiftable from the optical axis. A second auxiliary convex lens 92 is disposed between the mirror 87 and the second collection member 88 so as to be shiftable. First and second shield members 95a and 95b having the same structure as the shield members of the preceding embodiment are movably disposed between the second collection member 88 and second auxiliary convex lens 92. Shield members 95c and 95d having the same structure are movably disposed between the second diffusion member 86 and first auxiliary convex lens 91.

According to the above structure, light from the light source 80 is efficiently collected and substantial paralleled by the parallel-beam member 82 and made incident on the first diffusion plate 83. The first diffusion plate 83 functions as a substantially uniform, large-area light source for the illumination field. The light diffused by the first diffusion plate 83 is collected by the first collection member 85. The first collection member 85 functions to collect the light, which has been diffused by the first diffusion plate 83 in scattering directions, in a converging direction effective for illumination.

The light incident on the second diffusion plate 86 is further diffused along the converging direction. The second diffusion plate 86 diffuses light to meet the numerical aperture and becomes a final light source. The light diffused by the second diffusion plate 86 is deflected upward by the deflection mirror 87, made incident on the second collection member 88, and passed through the sample-mounting transparent member 89, thus illuminating the sample 90.

The first auxiliary convex lens 91 interposed between the second diffusion plate 86 and deflection mirror 87 functions to intensity the light beam and enhance the efficiency of use of light for the high-magnification objective lens having a narrower illumination field and a greater numerical aperture. The second auxiliary convex lens 92 interposed between the deflection mirror 87 and second collection member 88 functions to enhance the power of the convex lens in combination with the second collection member 88, thereby narrowing the illumination field and illuminating the sample 90 at a greater angle. In other words, since the illumination optical system is switched according to the magnification of the objective lens, observation can be made under the optimal illumination condition.

The high-magnification objective lens has a shorter focal distance, and the pupil-conjugate position in the illumination apparatus becomes as close as possible to the second collection member 88. In the case of the low-magnification objective lens, the pupil-conjugate position normally becomes away from there and located before the turning point of the optical axis at the deflection mirror 87. Accordingly, the brightness reduction is made by independently shifting each shield member 95a, 95b, and 95c, 95d to/from the optical axis, and also the oblique illumination can be achieved by displacing, as desired, each shield member from the optical axis.

The shield members 95a, 95b (95c, 95d) can be shifted by the driving mechanisms shown in FIGS. 13 to 16B. The pupils of the right and left objective lenses are uniformly reduced by the shield members in the up-and-down direction, as shown in FIGS. 12B to 12D and FIGS. 21 to 26B. Since the right and left pupils are uniformly reduced, the right and left images are uniformly viewed. Thus, a natural stereoscopic effect is created by the right-and-left parallax characterizing the stereomicroscope. Moreover, like the above-described embodiment, the ratio between direct light incident on the object lens of pupil and diffraction light can be controlled by shifting the shield members. Accordingly, the contrast can be increased or varied successively. Specifically, very fine contrast adjustment can be made for a sample with a fine structure. A matter, which is not observable in the prior art, can be observed. Since the stop is disposed at the position suitable for high magnification and low magnification, oblique illumination can be performed in a range from high magnification to low magnification. Furthermore, since the switching between the low magnification and high magnification is achieved by the addition of the lenses 91 and 92, the structure is simple and inexpensive. Since the two diffusion plates are disposed and the function of each diffusion plate is made clear, the optimal design for the optical system can easily be made with higher efficiency. There is no need to use a diffusion plate which has an unnecessarily great diffusion effect.

Figure 37:
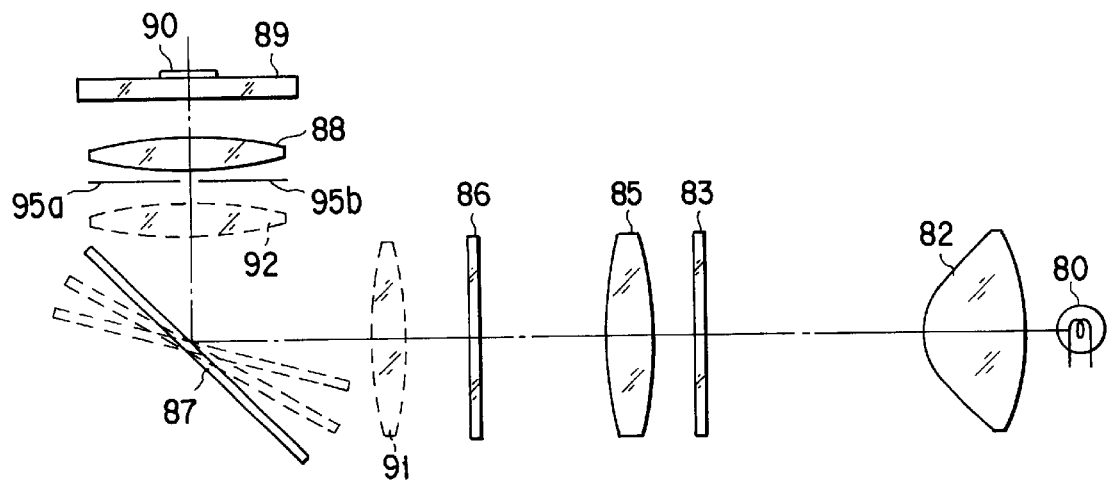
FIG. 37 shows a modification of the embodiment shown in FIG. 36.

FIG. 37 shows a modification of the structure shown in FIG. 36. This modification differs from the structure shown in FIG. 36 in that the deflection mirror 87 is made rotatable and the low-magnification-side shield members 95c and 95d are removed.

This is based on a demand for high-magnification observation in a case of observing a fine structure, mainly from the standpoint of resolution. As regards low-magnification observation, a large visual field with a sufficient illumination effect (oblique illumination) can be obtained with such a contrast as in the prior art by means of the rotatable deflection mirror 87a. In this way, high-magnification oblique illumination is performed using the shield members 95a and 95b, while low-magnification oblique illumination is performed using the deflection mirror 87a. Thus, the cost can be reduced. Besides, the operability is high since the oblique illumination can be made with the deflection mirror 87a at a middle magnification at which the conjugate relationship of the pupil position is not sufficient.

The illumination system according to the embodiment shown in FIGS. 36 and 37 is an example wherein the requirements for the illumination field and numerical aperture (pupil) are met at high magnification and low magnification. Accordingly, even if the above-described shield members are disposed at the pupil position of the conventional bright-field illumination apparatus, oblique illumination can be performed adequately. However, in order to fully exhibit general-purpose properties and effect in the oblique illumination, it is preferable to combine the illumination system with the above-described illumination system or an optical system having a wider visual field and a larger numerical aperture.

In the illumination optical system shown in the figure, it is possible to integrate the first and second diffusion plates 83 and 86, dispense with the first collection member 85, and have the lens effect shared by the first and second diffusion plates. It is also possible to vary the focal distances of the first and second collection members 85 and 88, instead of interposing the first and second auxiliary convex lenses 91 and 92. Moreover, it is possible to change the positions where the auxiliary convex lenses are interposed.

In the embodiments shown in FIGS. 36 and 37, the following modifications may be made.

At least two shield members may be movably disposed at two locations conjugate with the high-magnification pupil position and low-magnification pupil position of a zoom-stereomicroscope. With this structure, optimal oblique illumination can be achieved at high magnification and low magnification.

The optical system shown in the figure may be provided with another deflection member for deflecting upward the light-emission optical axis from the light source. This deflection member is inclined to incline illumination light. In combination with the inclination of another deflection member, the range of oblique illumination is increased.

A third embodiment of the present invention will now be described.

Figures 38A, 38B:
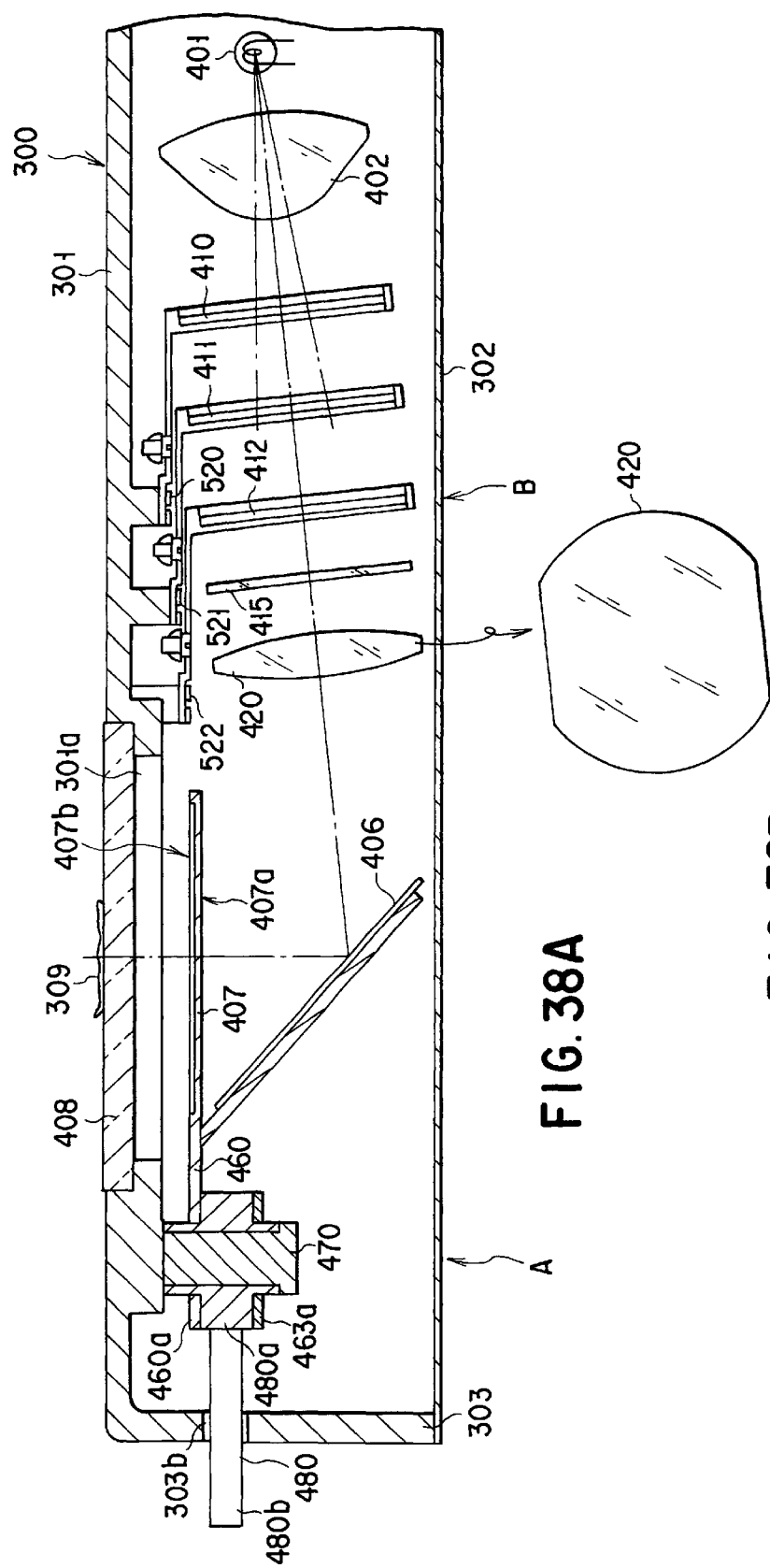
FIG. 38A shows a third embodiment of the microscope transmission-illumination apparatus according to the present invention and, in particular, a bright-field optical system.
FIG. 38B shows a shape of a convex lens.

FIG. 38A is a side view showing a transmission-illumination optical apparatus disposed in a transmission-illumination frame of a stereomicroscope. The stereomicroscope has the structure as shown in FIG. 6, and so the shape of the entirety thereof is not shown.

In the transmission-illumination optical apparatus according to this embodiment, a bright-field optical system and a dark-field optical system are switchable by means of an optical system switching mechanism (to be described later). FIG. 38A shows the bright-field optical system.

A light source 401 such as a halogen lamp is provided within a housing 300. Light from the light source 401 is converted to a substantial parallel beam through a collector lens 402. The substantial parallel beam is deflected by a deflection member (deflection mirror) 406 to illuminate a sample 309 placed on a sample-mounting glass (specimen-mounting glass) 408 provided in an opening 301a formed in an upper surface 301 of the housing 300. In this case, the collector lens 402 is disposed such that the light-emission optical axis of the light source 401 is inclined in an oblique downward direction by about 5 to 10 degrees (6 degrees in this embodiment) to the horizontal direction.

On the optical axis between the light source 401 and deflection member 406, there are provided filters 410, 411 and 412 which can be shifted to/from the optical axis by means of a filter shifting mechanism (to be described later), a diffusion plate 415, and a convex lens 420 of a substantially oval shape (see FIG. 38B) obtained by cutting out upper and lower portions of a circular lens. In addition, a convex lens 407 having a Fresnel surface 407a and a diffusion surface 407b is provided between the deflection member 406 and sample-mounting glass 408.

In the above structure, the switchable elements for the bright-field optical system are the deflection member 406, convex lens 407 and diffusion plate 415.

Figures 39A, 39B:
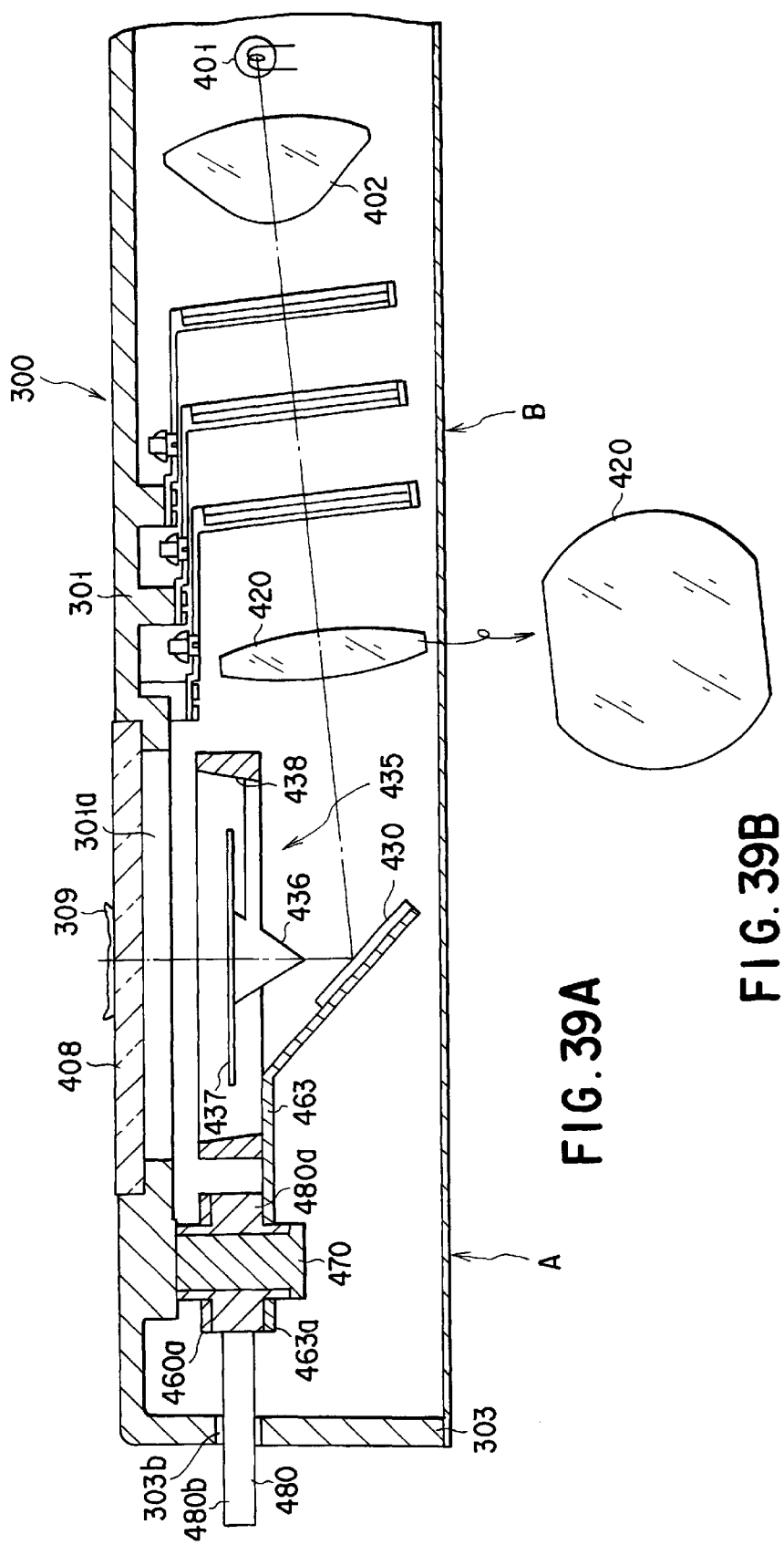
FIG. 39A cross-sectional view showing, in particular, a dark-field optical system in the structure shown in FIG. 38A.
FIG. 39B shows a shape of a convex lens.

FIG. 39A shows the dark-field optical system. The dark-field optical system includes a second deflection member 430 for deflecting upward the light emitted from the light source 401, and a shield member 435 for obliquely radiating the deflected light to the sample 309. In order to reflect the light reflected by the second deflection member toward the circumference from the center at the optical axis, the shield member 435 comprises an upwardly opening conical reflection mirror 436; a circular shield plate 437 attached to a bottom portion of the reflection mirror 436; and a cylindrical reflection mirror 438 for making the light reflected from the reflection mirror 436 incident obliquely on the sample 309. With this structure, the light deflected upward by the second deflection member 430 is shut off by the circular shield plate 437. The reflection mirrors 436 and 438 produce annular illumination with a large opening angle, thus subjecting the sample 309 to dark-field illumination via the sample-mounting glass 408.

The second deflection member 430 and shield member 435 may be integrally formed of, e.g. a resin. In this case, the above-mentioned mirror may be attached to a light reflection portion, or aluminum for reflecting light may be deposited thereon.

In the above structure, the switchable elements for the dark-field optical system are the second deflection member 430 and shield member 435.

Figure 40:
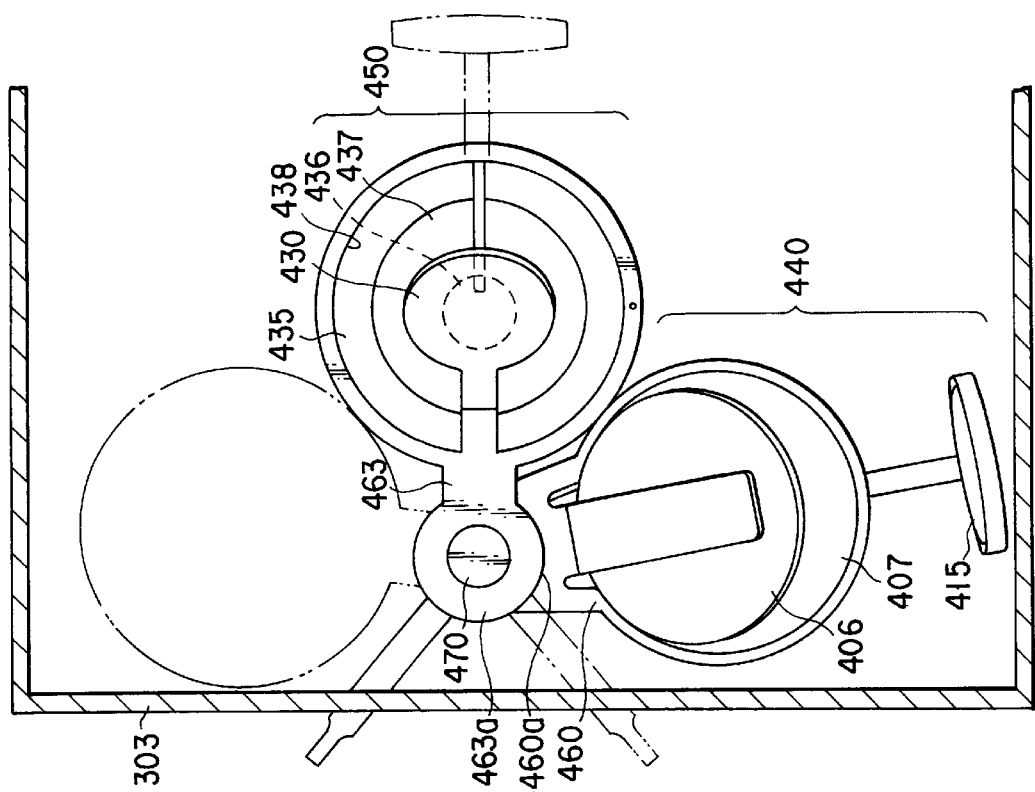
FIG. 40 shows an optical system switching mechanism.

Referring to FIGS. 38A, 39A and 40, a description will now be given of the optical system switching mechanism for switching the bright-field optical system and dark-field optical system. FIG. 40 shows the optical system switching mechanism, as viewed in a direction A in FIGS. 38A and 39A, with a bottom plate 302 of the housing removed. In the figures, numerals 440 and 450 denote the bright-field optical system and dark-field optical system.

The bright-field optical system 440 comprises the diffusion member 415, deflection member 406 and convex lens 407, as described above, and these are integrally coupled, at their proximal end portions, to a bright-field-side support member 460 having an annular mounting portion 460a. The dark-field optical system 450 comprises the second deflection member 430 and shield member 435, as described above, and these are integrally coupled, at their proximal end portions, to a dark-field-side support member 463 having an annular mounting portion 463a.

A cylindrical shaft 470 is vertically fixed to the upper surface 301 of the housing 300 at a position opposite to the light source 401. The mounting portion 460a of bright-field-side support member 460 and the mounting portion 463a of dark-field-side support member 463 are rotatably fitted on the shaft 470. In addition, an annular mounting portion 480a formed at the proximal end of an operation lever 480 is rotatably provided on the shaft 470. The mounting portions 460a and 463a are fixed to the mounting portion 480a by means of a fixing section (not shown). A knob portion 480b is formed at a distal end portion of the lever 480. The knob portion is projected from a lever operation slot 303b formed in a side surface of the housing 300.

Accordingly, by shifting the knob portion 480b of lever 480 along the slot 303b, a switching operation can be performed so that either the bright-field optical system 440 or the dark-field optical system 450 may be situated on the optical axis (FIG. 40 showing a state in which the dark-field optical system is situated on the optical axis).

By referring to FIGS. 38A and 41, the mechanism for shifting the filters 410, 411 and 412 will now be described. Each filter is horizontally shifted off the optical axis.

Figure 41:
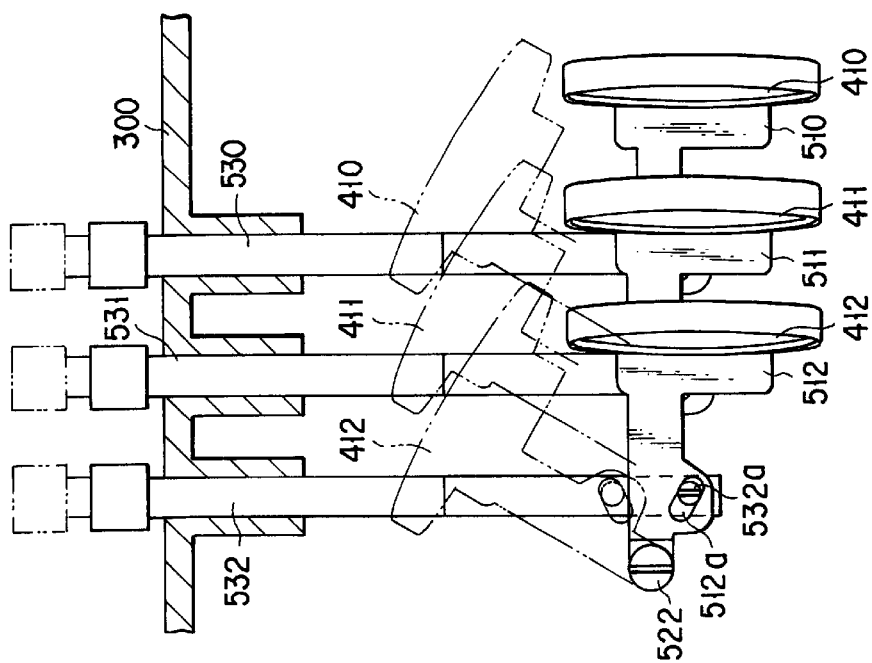
FIG. 41 shows a filter insert/remove mechanism.

FIG. 41 is a view taken in a direction B in FIG. 38A, with the bottom plate 302 of the housing removed. The filters 410, 411 and 412 are disposed to intersect at right angles with the optical axis (inclined 6 degrees downward) which is determined as described above. The respective filters are supported at one end on support arms 510, 511 and 512. The support arms are rotatably supported at the other end on three vertical shafts 520, 521 and 522 fixed to the upper surface of the housing 300.

The housing 300 is provided with three operation shafts 530 to 532 associated with the support arms 510, 511 and 512. The three operation shafts 530 to 532 can be pushed/pulled by a predetermined stroke. A pin is fixed to one end portion of each operation shaft. (The figure shows a pin 532a of the operation shaft 532 alone). The respective pins are passed through slots (the figure showing a slot 512a in support arm 512 alone) in the respective support arms 510, 511 and 512. As a result, if the operation shaft 532 is pulled out to a position indicated by a two-dot-and-dash line, the pin 532a moves along the slot 512a and rotates the support arm 512 about the vertical shaft 522. Thus, the filter 412 is shifted to a position off the optical axis, as indicated by a two-dot-and-dash line. On the other hand, if the operation shaft 532 is returned from that position to a position indicated by a solid line, the filter 412 is shifted to the position on the optical axis, as indicated by the solid line. The same push/pull operation can be performed for the other filters 410 and 411 by means of the operation shafts 530 and 531.

According to the transmission-illumination optical apparatus with the above structure, the optical path length from the light source to the sample is great, and, in particular, the optical path is elongated in the horizontal direction. Thus, the optical element such as the above-described filter can be disposed without increasing the height between the upper surface of the stage, on which the sample is mounted, and the bottom surface of the housing. In particular, since each filter rotates in the horizontal plane and shifted onto/off the optical axis, the height of the housing is not increased. Specifically, since the filter 410, 411, 412 is horizontally rotated off the optical axis, the position thereof in the height direction is unchanged and there is no need to unnecessarily increase the height of the housing. In addition, since each filter is coupled to the operation shaft 530, 531, 532 by means of the above-described link mechanism, a slight operation amount (the amount of a pulling operation for the operation shaft) is adequate to shift each filter onto/off the optical axis.

In the above structure, the diffusion member 415 greatly contributes to determining the illumination field. If the degree of diffusion is increased, a wider illumination field is covered. If the degree of diffusion is decreased, a narrower illumination field is covered. By the shifting of the diffusion member, the range of field can be controlled. Bright illumination can be performed for a narrower field. The substantially oval convex lens 420, as shown in FIGS. 38B and 39B, has such a shape that the upper and lower circumferential portions of a circle are cut out. The reason for this is that when a sample is to be observed by a stereomicroscope, sufficient illumination needs to be provided in the right-and-left direction and a lens with a large diameter needs to be used in order to increase the numerical aperture. As regards illumination in the front-and-back direction, a lens with such a large diameter is not needed. In other words, even if the diameter of the lens in the up-and-down direction is small, sufficient illumination can be provided in the right-and-left direction. An optical system with a small dimension in the up-and-down direction can be constructed using the substantially oval convex lens 420 with their upper and lower circumferential portions cut out. Such a lens can be formed of a resin.

The deflection member 406 vertically deflects the optical axis which is inclined 6 degrees to the horizontal direction. Accordingly, the deflection member 406 can be disposed such that the angle for light incidence and light emission is 84 degrees, that is, the incident light is reflected at 42 degrees to the line normal to the mirror surface, as shown in FIG. 42B. Where the diameter of the required light beam is ϕ40, the height is 40−40×tan42°=4 and the height of the apparatus can be thinned by 4 mm, compared to the ordinary case of reflection at 45 degrees, as shown in FIG. 42A.

If a diffusion plate is inserted in the filter 410 and it is shifted in/out along with the filter 410, the degree of diffusion of the diffusion plate 415 in the bright-field optical system can be varied and the illumination field controlled. If a Fresnel lens is substituted for the convex lens 407, the thickness of the lens can be thinned even if it is large and the degree of diffusion of the diffusion plate 415 can be increased to produce scattering light with high intensity. In this case, light is bent by the Fresnel surface 407a in a converging direction and passed through the diffusion surface 407b. Compared to the illumination field of the ordinary microscope which is about ϕ35, an illumination field with ϕ60 to ϕ70 can be obtained. In other words, about four times the area can be illuminated.

On the other hand, in the dark-field optical system, the diffusion member 415 is shifted off the optical path and the non-diffused light is converged by the convex lens 420. The converged light is guided to the second deflection member 430 and shield member 435, thereby obliquely illuminating the sample 309. In this case, the circular shield plate 437 shuts off leak light from below and darkens the background of the dark field.

Whichever of the bright-field optical system and the dark-field optical system is switched, either the bright-field optical system or the dark-field optical system can completely use the light taken in by the collector lens 402. Accordingly, uniform illumination with high efficiency and high brightness can be performed. The illumination path including the dark-field illumination system can be elongated, and a wide field can be illuminated with little non-uniformity. Moreover, since the diffusion surface 407a is provided at the final plane of the bright field, a very large field can be illuminated.

Since the optical axis is inclined at a predetermined angle, the plural filters 410, 411 and 412 are disposed along the optical axis with their height positions displaced from one another. Accordingly, the support arms can be disposed along the optical axis in an overlapping manner and the plural filters can be supported in a compact form.

The shift-in/out mechanism for each filter may be of the rotary type, as shown in FIG. 41, as well as of the slide type, for example. Specifically, as shown in FIGS. 43A and 43B, the filter 410 is held to one end portion of an operation plate 550, and the other end portion of the operation plate 550 is projected out of the upper surface 301 of the housing. This other end portion is held and operated in a range of stroke L.

According to the above-described transmission-illumination optical apparatus, the following advantages can be obtained.

(1) Without narrowing the visual field with which the sample can be illuminated, the height of the housing can be reduced, that is, the dimension between the sample-mounting surface and the bottom surface can be reduced.

(2) When the microscope having the transmission-illumination optical apparatus is actually designed, the upper surface of the transparent member, on which the sample is placed, can be made broad and thin.

(3) Since the filters 410 to 412 are built in, the illumination can be altered without moving the sample 309.

Moreover, such filters do not adversely affect the thickness of the apparatus.

(4) In the dark-field illumination system, the light beam emitted from the light source 401 can be used without waste and bright illumination can be performed. In the bright-field illumination system, the optical path can be elongated in design and thus a wide illumination field with less non-uniformity can be obtained with ease. Moreover, since the optical systems are switched by the single lever 480, a desirable illumination method using the bright-field optical system or dark-field optical system can be easily chosen in accordance with the sample. In this case, bright illumination is performed for dark-field illumination, and uniform illumination performed for bright-field observation.

(5) Since each optical system is switched by horizontal rotation, the thickness of the apparatus can be reduced.

(6) By virtue of the adoption of the Fresnel lens 407 and the structure of the convex lens 420, the thickness of the optical apparatus can be reduced.

(7) Where a wide field is to be illuminated, deficiency of peripheral light can be avoided by using the diffusion plate and increasing the angle of diffusion.

A modification of the above-described third embodiment will now be described with reference to FIGS. 44A to 46. In this modification, the same elements as in the above embodiment are denoted by like reference numerals and a description thereof is omitted.

Figures 44A, 44B:
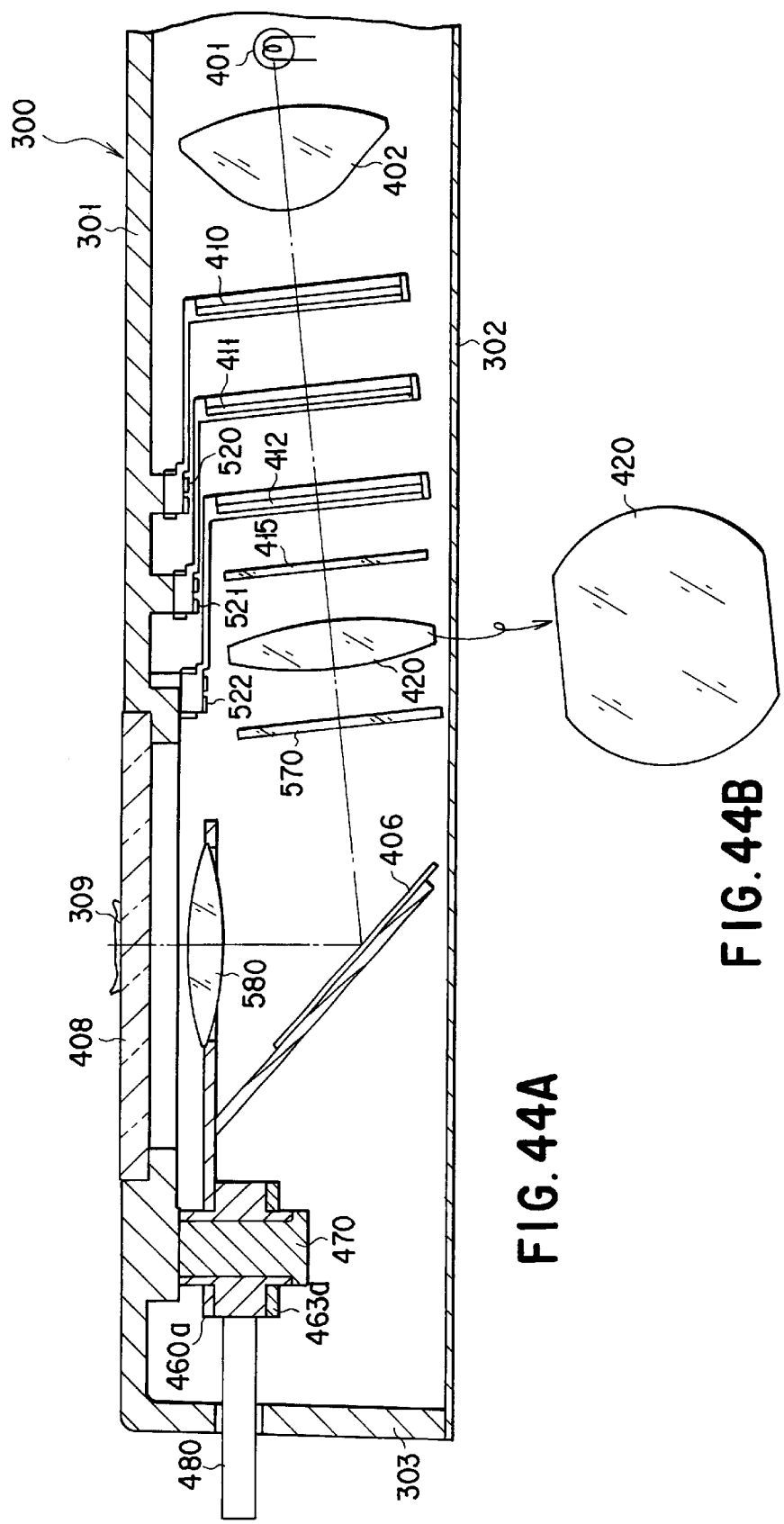
FIG. 44A shows a first modification of the third embodiment and, in particular, a bright-field optical system.
FIG. 44B shows a shape of a convex lens.

The dark-field optical system in this modification has the same structure as shown in FIG. 39A, and the bright-field optical system is constructed as shown in FIG. 44A. In this modification, the optical axis is inclined 10 degrees to the horizontal direction.

In the bright-field optical system, as shown in the figure, a second diffusion plate 570 is disposed behind the convex lens 420. In addition, the light deflected by the deflection member 406 is collected by a convex lens 580. The first diffusion plate 415, second diffusion plate 570, deflection member 406 and convex lens 580 are constructed to be rotated as one body by means of the switching mechanism.

Figure 46:
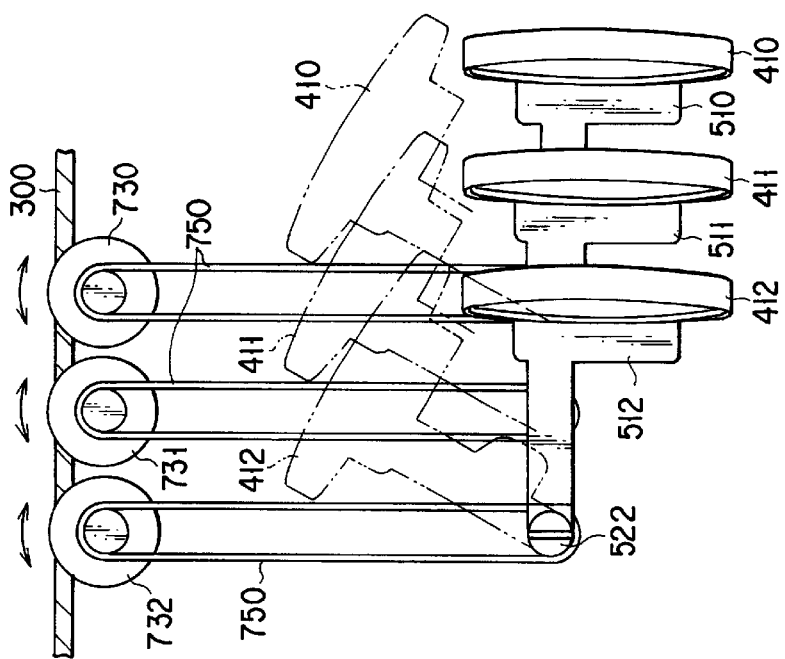
FIG. 46 shows a filter switching mechanism in the first modification.
Figure 45:
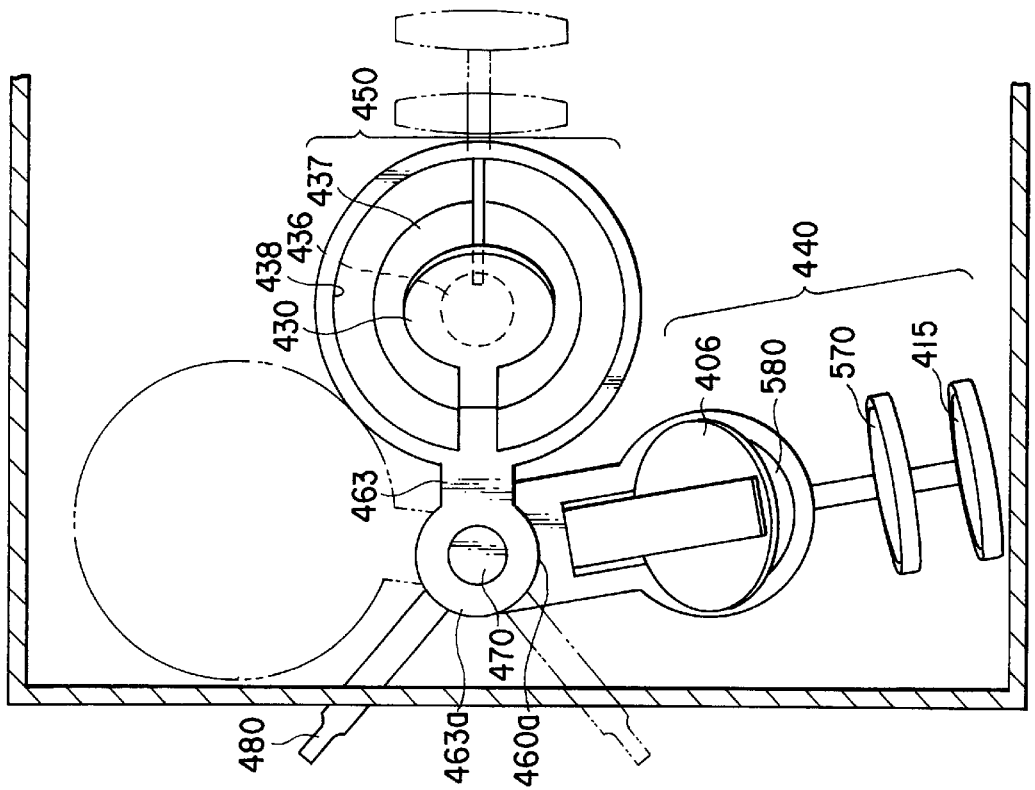
FIG. 45 shows an optical system switching mechanism in the first modification.

The filter shift-in/out mechanism in this modification is constructed as shown in FIG. 46. The respective filters 410, 411 and 412 are disposed perpendicular to the optical axis inclined by 10 degrees such that their height positions differ from one another. The filters are supported at one end to the support arms 510, 511 and 512, and the support arms are rotatably supported at the other end to the three vertical shafts 520, 521 and 522 fixed to the upper surface of the housing 300. Rotary knobs 730, 731 and 732 are rotatably attached to the housing 300 so as to permit an external rotating operation. The rotary knobs and the vertical shafts 520, 521 and 522 are coupled by means of ring-shaped belts 750. By rotating the rotary knobs, the filters 410, 411 and 412 are switched to positions indicated by two-dot-and-dash lines or positions indicated by solid lines.

According to the above structure, the deflection member 406 vertically deflects the optical axis which is inclined 10 degrees to the horizontal direction. Accordingly, the deflection member 406 can be disposed such that the angle for light incidence and light emission is 80 degrees, that is, the incident light is reflected at 40 degrees to the line normal to the mirror surface. Where the diameter of the required light beam is ϕ40, the height is 40−40×tan40°=6.4 and the height of the apparatus can be thinned by 6.4 mm, compared to the ordinary case of reflection at 45 degrees.

In the above-described structure, the angle of inclination of the light-emission optical axis from the light source 401 is 6 degrees or 10 degrees. According to experimental results, the above operational advantages can be obtained if the angle is about 5 to 10 degrees. If the angle of inclination of the light-emission optical axis from the light source 401 is too small, the effect of thin size is lost. If the angle of inclination of the light-emission optical axis from the light source 401 is too large, the illumination beam is led to a position higher than the upper surface of the sample-mounting transparent member and the sample-mounting transparent member is restricted.

In the mirror 436, 438 of the above-described dark-field optical system may collect and scatter light at its curved portion other than the conical or cylindrical portion shown in the figures. Each mirror 436, 438 may be processed with metal.

Aside from the above-described embodiments, the bright-field optical system may freely be combined with some other optical member. The switching of the diffusion member may be performed not by the switching mechanism of the above-described optical system, but by a structure such as the above-described filter shift-in/out mechanism such that the diffusion member may be independently shifted onto/off the optical axis. The belts 750 of the filter shift-in/out mechanism shown in FIG. 46 may be replaced with gears. The Fresnel lens 407 having the integrally formed diffusion surface may be replaced with the ordinary lens 580, as shown in FIG. 44A if an increase in thickness is permitted. In this case, the diffusion plate 570 functions similarly with the diffusion surface 407a.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission-illumination apparatus for use in a microscope, the apparatus comprising:
   a transmission-illumination optical system having a light source and a condenser lens for collecting light emitted from the light source and illuminating a sample; and
   an observation optical system including an objective lens for observing the sample,
   wherein in said transmission-illumination optical system at least two shield members for controlling a shape of an aperture created in a pupil of the objective lens are disposed at or near positions conjugate with a pupil position of the objective lens, and
   a condition, NA2/NA1<0.6, is satisfied, where NA1 is a maximum illuminable numerical aperture of said condenser lens, and NA2 is a numerical aperture of the objective lens at which a maximum illumination range of the condenser lens can be observed.

2. A microscope transmission-illumination apparatus according to claim 1, wherein at least one optical member for partly controlling a light intensity of the aperture created in the pupil of the objective lens is provided at or near a position where said shield members are disposed.

3. A microscope transmission-illumination apparatus according to claim 1, wherein said condenser lens has an aperture stop, and said shield members are disposed near a position of said aperture stop.

4. A microscope transmission-illumination apparatus according to claim 1, wherein a condition, D2/D1≦0.5, is satisfied, where D1 is an area of the pupil of the objective lens and D2 is an area of an aperture portion created in the pupil of the objective lens, which is formed by the shield members.

5. A microscope transmission-illumination apparatus according to claim 1, wherein said condenser lens has an aperture stop, at least one lens group lying between said aperture stop and the sample is constructed to be attachable/detachable or switchable in accordance with a low magnification and a high magnification, and said shield members are disposed at or near the pupil position of the condenser lens in a low-magnification mode.

6. A microscope transmission-illumination apparatus according to claim 5, wherein a condition, F1/F2<0.45, is satisfied, where F1 is a high-magnification-side focal distance of the condenser lens, and F2 is a low-magnification-side focal distance.

7. A microscope transmission-illumination apparatus according to claim 1, wherein said apparatus has at least two driving mechanisms, respectively connected to said at least two shield members, for respectively driving said at least two shield members.

8. A microscope transmission-illumination apparatus according to claim 1, wherein said apparatus has a driving mechanism for driving said at least two shield members in an interlocking manner.

9. A microscope transmission-illumination apparatus according to claim 1, wherein said objective lens is used for a stereomicroscope having paired right and left objective-lens optical axes, and
   said at least two shield members are held to be shiftable in a front-and-rear direction perpendicular to a plane including said paired right and left objective-lens optical axes, such that aperture shapes of pupils of said objective lenses created by said shield members are asymmetric with respect to said plane including said paired right and left objective-lens optical axes.

10. A microscope transmission-illumination apparatus according to claim 9, wherein said apparatus has at least two driving mechanisms, respectively connected to said at least two shield members, for respectively driving said at least two shield members.

11. A microscope transmission-illumination apparatus according to claim 1, wherein said at least two shield members shield the pupil of said objective lens and are disposed such that their boundaries become parallel to each other, and
   the shape of the aperture created in the pupil of the objective lens is asymmetric with respect to the optical axis of the objective lens.

12. A microscope transmission-illumination apparatus according to claim 1, wherein said at least two shield members are disposed in the same plane crossing an optical axis of the objective lens.

13. A microscope transmission-illumination apparatus according to claim 1, further comprising a first driving mechanism for adjusting a distance between said at least two shield members, and a second driving mechanism for moving said at least two shield members by a same distance in a same direction.

14. A microscope transmission-illumination apparatus according to claim 13, further comprising a common operation member for operating the first driving mechanism and the second driving mechanism, the operation member performing a rotation operation to operate the first driving mechanism, and performing a push and pull operation to operate the second driving mechanism.

* * * * *